United States Patent
Charles

(10) Patent No.: US 9,862,479 B1
(45) Date of Patent: Jan. 9, 2018

(54) METHODS OF MAKING AND STRUCTURES CONTAINING STIFFENERS HAVING TRANSITION PORTIONS

(71) Applicant: The Boeing Company, Chicago, IL (US)

(72) Inventor: Jordan D. Charles, Seattle, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 15/690,521

(22) Filed: Aug. 30, 2017

Related U.S. Application Data

(62) Division of application No. 14/835,829, filed on Aug. 26, 2015.

(51) Int. Cl.
| | |
|---|---|
| *B64C 3/26* | (2006.01) |
| *B29D 99/00* | (2010.01) |
| *B32B 37/02* | (2006.01) |
| *B32B 3/26* | (2006.01) |
| *B32B 3/18* | (2006.01) |

(52) U.S. Cl.
CPC ............ *B64C 3/26* (2013.01); *B29D 99/0003* (2013.01); *B32B 3/18* (2013.01); *B32B 3/263* (2013.01); *B32B 37/02* (2013.01); *B32B 2305/076* (2013.01); *B32B 2305/08* (2013.01); *B32B 2605/18* (2013.01)

(58) Field of Classification Search
CPC ....... B29D 99/0003; B32B 3/18; B32B 3/263; B32B 37/02; B32B 2305/076; B32B 2305/08; B32B 2605/18; B64C 3/26
See application file for complete search history.

(56) References Cited

U.S. PATENT DOCUMENTS

| | | | | |
|---|---|---|---|---|
| 4,053,667 A | * | 10/1977 | Smith | B29C 70/342 138/144 |
| 4,606,961 A | * | 8/1986 | Munsen | B29C 70/08 428/105 |
| 4,789,594 A | * | 12/1988 | Stawski | B26D 1/02 156/222 |
| 4,966,802 A | * | 10/1990 | Hertzberg | B29C 65/601 112/423 |
| 5,397,415 A | * | 3/1995 | Manabe | B26D 3/08 156/234 |
| 5,954,898 A | * | 9/1999 | McKague | B29C 70/342 156/182 |
| 6,849,150 B1 | * | 2/2005 | Schmidt | B29C 65/5085 156/285 |
| 7,045,084 B1 | * | 5/2006 | Reis | B29B 11/16 264/138 |

(Continued)

*Primary Examiner* — James M Ference
(74) *Attorney, Agent, or Firm* — Walters & Wasylyna LLC

(57) ABSTRACT

A stiffener 100 comprises a first stiffener portion (102), having a first cross-sectional profile (104) that is constant along the first stiffener portion (102). The stiffener 100 also comprises a second stiffener portion (106), having a second cross-sectional profile (108) that is constant along the second stiffener portion (106). The second cross-sectional profile (108) of the second stiffener portion (106) is different from the first cross-sectional profile (104) of the first stiffener portion (102). The stiffener 100 additionally comprises a transition stiffener portion (110) tapering from the second stiffener portion (106) to the first stiffener portion (102).

20 Claims, 24 Drawing Sheets

(56) References Cited

U.S. PATENT DOCUMENTS

| | | | | |
|---|---|---|---|---|
| 7,244,487 B2* | 7/2007 | Brantley | B29C 65/561 | 244/123.7 |
| 7,494,092 B2* | 2/2009 | Brenner | B64C 1/12 | 244/119 |
| 7,823,362 B2* | 11/2010 | Meyer | B64C 1/064 | 244/120 |
| 8,074,694 B2* | 12/2011 | Brook | B29C 70/222 | 156/182 |
| 8,074,696 B2* | 12/2011 | Furukubo | B28B 11/006 | 156/708 |
| 8,262,969 B2* | 9/2012 | Wade | B29C 70/342 | 264/257 |
| 8,276,848 B2* | 10/2012 | Zuniga Sagredo | B64C 3/18 | 244/123.1 |
| 8,376,275 B2* | 2/2013 | Bolukbasi | B64C 1/062 | 244/119 |
| 8,540,921 B2* | 9/2013 | Senibi | B32B 5/18 | 264/257 |
| 8,703,269 B2* | 4/2014 | Reighley | B29D 99/0014 | 244/123.8 |
| 2002/0031641 A1* | 3/2002 | George | B32B 5/12 | 428/105 |
| 2002/0081415 A1* | 6/2002 | Toi | B29C 70/443 | 428/102 |
| 2003/0180501 A1* | 9/2003 | Kaye | B29C 70/30 | 428/119 |
| 2006/0249868 A1* | 11/2006 | Brown | B29C 70/342 | 264/163 |
| 2008/0029644 A1* | 2/2008 | Martinez Cerezo | B29C 70/34 | 244/119 |
| 2008/0246175 A1* | 10/2008 | Biornstad | B29C 53/587 | 264/109 |
| 2008/0268208 A1* | 10/2008 | Martin | B29C 70/16 | 428/174 |
| 2008/0290214 A1* | 11/2008 | Guzman | B29C 43/10 | 244/119 |
| 2008/0302912 A1* | 12/2008 | Yip | B29C 43/10 | 244/119 |
| 2009/0127393 A1* | 5/2009 | Guzman | B29C 44/583 | 244/133 |
| 2009/0176066 A1* | 7/2009 | Darrow | B29C 70/085 | 428/175 |
| 2009/0261199 A1* | 10/2009 | McCarville | B29C 70/30 | 244/117 R |
| 2009/0263618 A1* | 10/2009 | McCarville | B29C 70/30 | 428/113 |
| 2009/0317587 A1* | 12/2009 | Deobald | B29C 70/865 | 428/119 |
| 2010/0083504 A1* | 4/2010 | Johnson | B61D 17/041 | 29/897.2 |
| 2010/0170985 A1* | 7/2010 | Flood | B29C 70/30 | 244/117 R |
| 2010/0178453 A1* | 7/2010 | Wood | B29C 70/30 | 428/119 |
| 2010/0297390 A1* | 11/2010 | Forzan | B64C 1/064 | 428/119 |
| 2011/0139932 A1* | 6/2011 | Matheson | B64C 3/182 | 244/132 |
| 2011/0143081 A1* | 6/2011 | Fritz | B29C 70/30 | 428/77 |
| 2011/0315824 A1* | 12/2011 | Pook | B29C 70/443 | 244/133 |
| 2012/0052247 A1* | 3/2012 | Pook | B29C 65/5057 | 428/161 |
| 2012/0291285 A1* | 11/2012 | Kamaraj | B29C 70/34 | 29/897.2 |
| 2012/0308770 A1* | 12/2012 | Eli-Eli | B29C 70/22 | 428/120 |
| 2013/0026292 A1* | 1/2013 | Dubost | B64C 1/064 | 244/117 R |
| 2013/0084434 A1* | 4/2013 | Kehrl | B29C 70/207 | 428/174 |
| 2014/0322381 A1* | 10/2014 | Bland | B29C 70/205 | 425/394 |
| 2014/0361121 A1* | 12/2014 | Cominsky | B64C 1/26 | 244/131 |
| 2015/0053818 A1* | 2/2015 | Charles | B64C 3/182 | 244/124 |
| 2016/0107432 A1* | 4/2016 | Krajca | B29D 99/0014 | 156/250 |
| 2017/0057615 A1* | 3/2017 | Charles | B64C 3/26 | |

* cited by examiner

METHODS OF MAKING AND STRUCTURES CONTAINING STIFFENERS HAVING TRANSITION PORTIONS

PRIORITY

This application is a divisional of U.S. Ser. No. 14/835,829 filed on Aug. 26, 2015.

BACKGROUND

Aerodynamic loads experienced by aircraft structures, such as an aircraft wing, include, e.g., bending loads. Tough and lightweight composite materials are increasingly used in the construction of aircraft wings because they are capable of supporting the loads encountered during flight while enabling a decrease in weight of the aircraft. A common type of composite material used in aircraft construction is carbon fiber composite.

Generally, a wingbox structure of the aircraft wing includes a stiffened upper panel (or skin), a stiffened lower panel (or skin), opposed spars that connect to leading and trailing edges of the panels, and internal ribs that provide shape and support to the wingbox structure and connect the panels. It is desirable to decrease the thickness of the wing, particularly an outboard portion of the wing, as much as possible to improve the aerodynamic efficiency of the aircraft (e.g., a thicker wing encounters more drag). However, decreasing wing thickness continues to be a structural challenge because the height of the stiffeners limits how thin the wing can be constructed in view of the fact that the use of stiffeners having a reduced height to decrease wing thickness is limited. Low-profile stiffeners may be used to stiffen the lower panel since the lower panel is primarily in tension during flight. However, low profile-stiffeners are not suitable for the upper panel. High-profile stiffeners (e.g., stiffeners having a taller cross-sectional profile), such as I-shaped or T-shaped stiffeners, are needed to stiffen at least the majority of the upper panel since the upper panel is primary in compression during flight.

SUMMARY

Accordingly, apparatuses and methods, intended to address at least the above-identified concerns, would find utility.

The following is a non-exhaustive list of examples, which may or may not be claimed, of the subject matter according the present disclosure.

One example of the present disclosure relates to a stiffener. The stiffener comprises a first stiffener portion having a first cross-sectional profile that is constant along the first stiffener portion. The stiffener also comprises a second stiffener portion having a second cross-sectional profile that is constant along the second stiffener portion. The second cross-sectional profile of the second stiffener portion is different from the first cross-sectional profile of the first stiffener portion. The stiffener further comprises a transition stiffener portion tapering from the second stiffener portion to the first stiffener portion.

Another example of the present disclosure relates to a structure. The structure comprises a skin, comprising surface, and a stiffener, coupled to the surface of the skin. The stiffener comprises a first stiffener portion, having a first cross-sectional profile that is constant along the first stiffener portion. The stiffener also comprises a second stiffener portion, having a second cross-sectional profile that is constant along the second stiffener portion. The second cross-sectional profile of the second stiffener portion is different from the first cross-sectional profile of the first stiffener portion. The stiffener further comprises a transition stiffener portion, tapering from the second stiffener portion to the first stiffener portion.

Yet another example of the present disclosure relates to a method of making a stiffener. The method comprises laying up a base charge to form a part of a first stiffener portion of the stiffener from a first base-charge portion of the base charge, to form a part of a second stiffener portion of the stiffener from a second base-charge portion of the base charge, and to form a part of a transition stiffener portion of the stiffener from a transition base-charge portion of the base charge. The transition base-charge portion tapers from the second base-charge portion to the first base-charge portion. The method also comprises laminating an initial charge onto the base charge to form a part of the first stiffener portion of the stiffener from a first initial-charge portion of the initial charge and to form a part of the transition stiffener portion of the stiffener from a transition initial-charge portion of the initial charge. The first initial-charge portion of the initial charge is shaped identically to the first base-charge portion of the base charge, and the transition initial-charge portion of initial charge is shaped identically to at least a portion of the transition base-charge portion of the base charge. The method further comprises laminating a subsequent charge A onto the initial charge to form a part of the first stiffener portion of the stiffener from a first subsequent-charge-A portion of the subsequent charge A and to form a part of the transition stiffener portion of the stiffener from a transition subsequent-charge-A portion of the subsequent charge A. The first subsequent-charge-A portion of the subsequent charge A is shaped identically to the first initial-charge portion of the initial charge, and the transition subsequent-charge-A portion of the subsequent charge A is smaller than the transition initial-charge portion of the initial charge and is shaped identically to a portion of the transition initial-charge portion.

BRIEF DESCRIPTION OF THE DRAWINGS

Figure 1A:
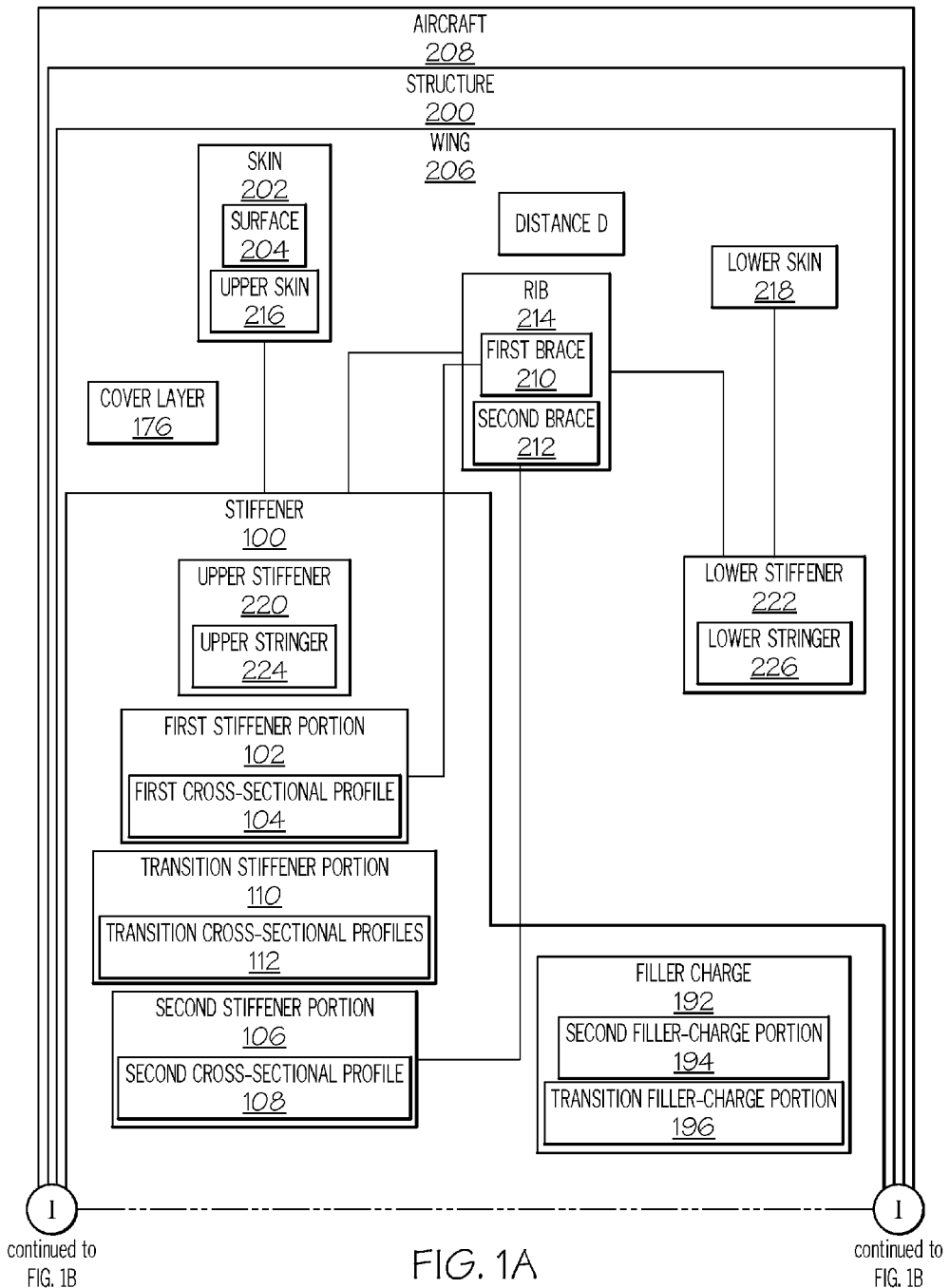
Figure 1B:
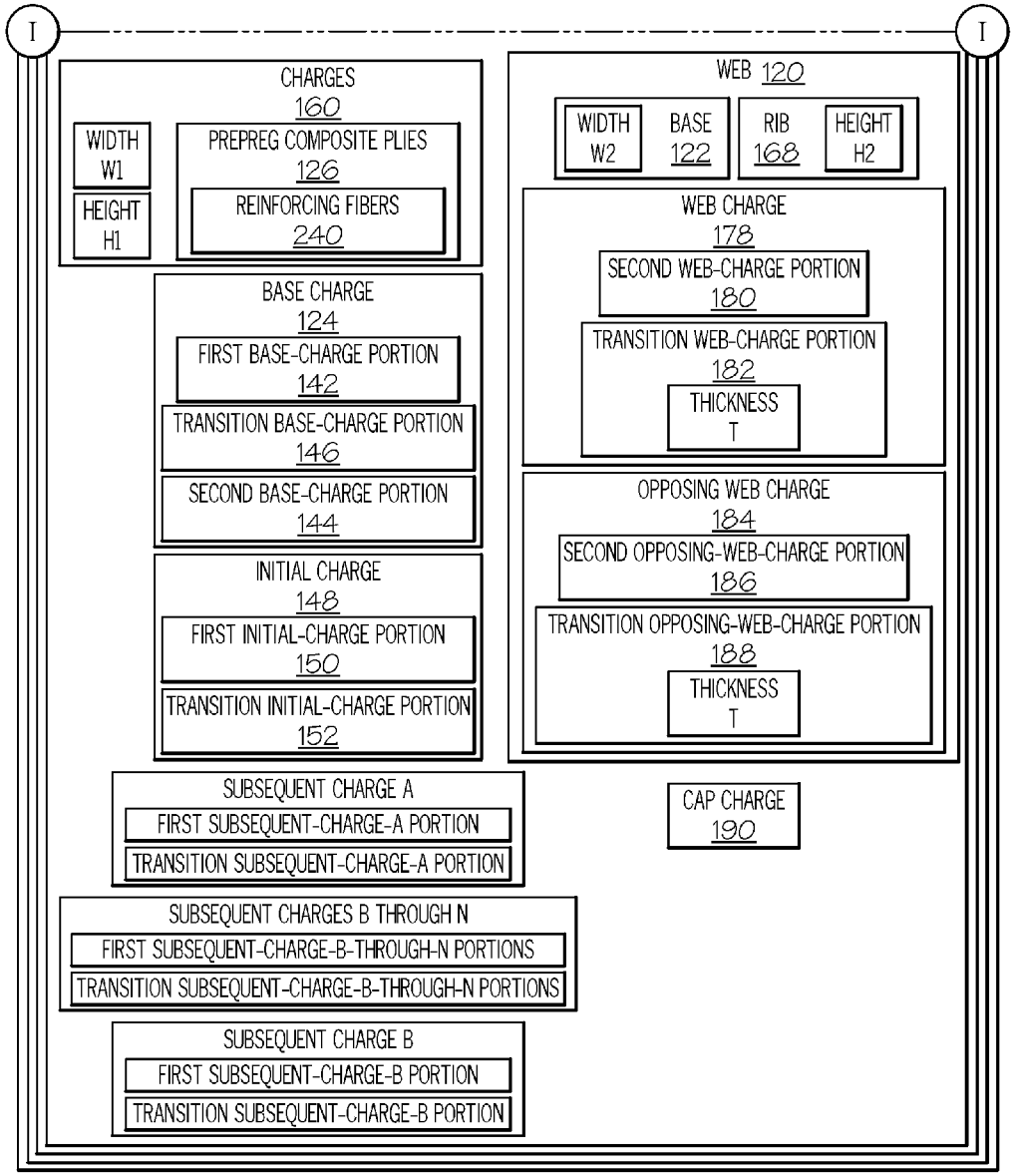
Figure 2:
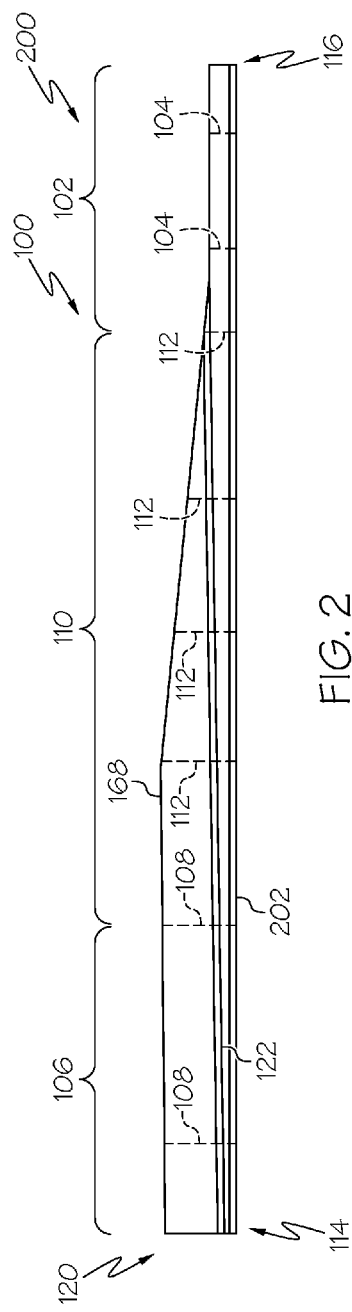
Figure 3:
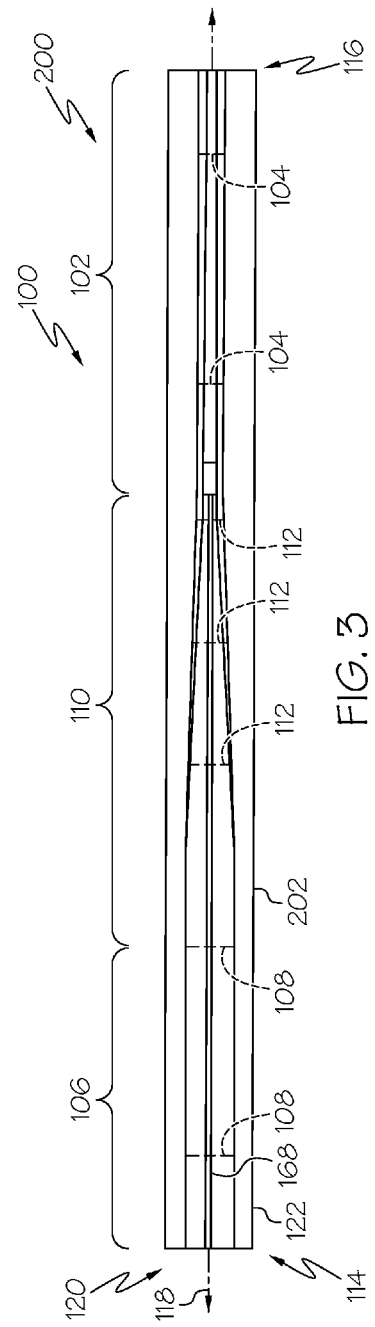
Figure 4:
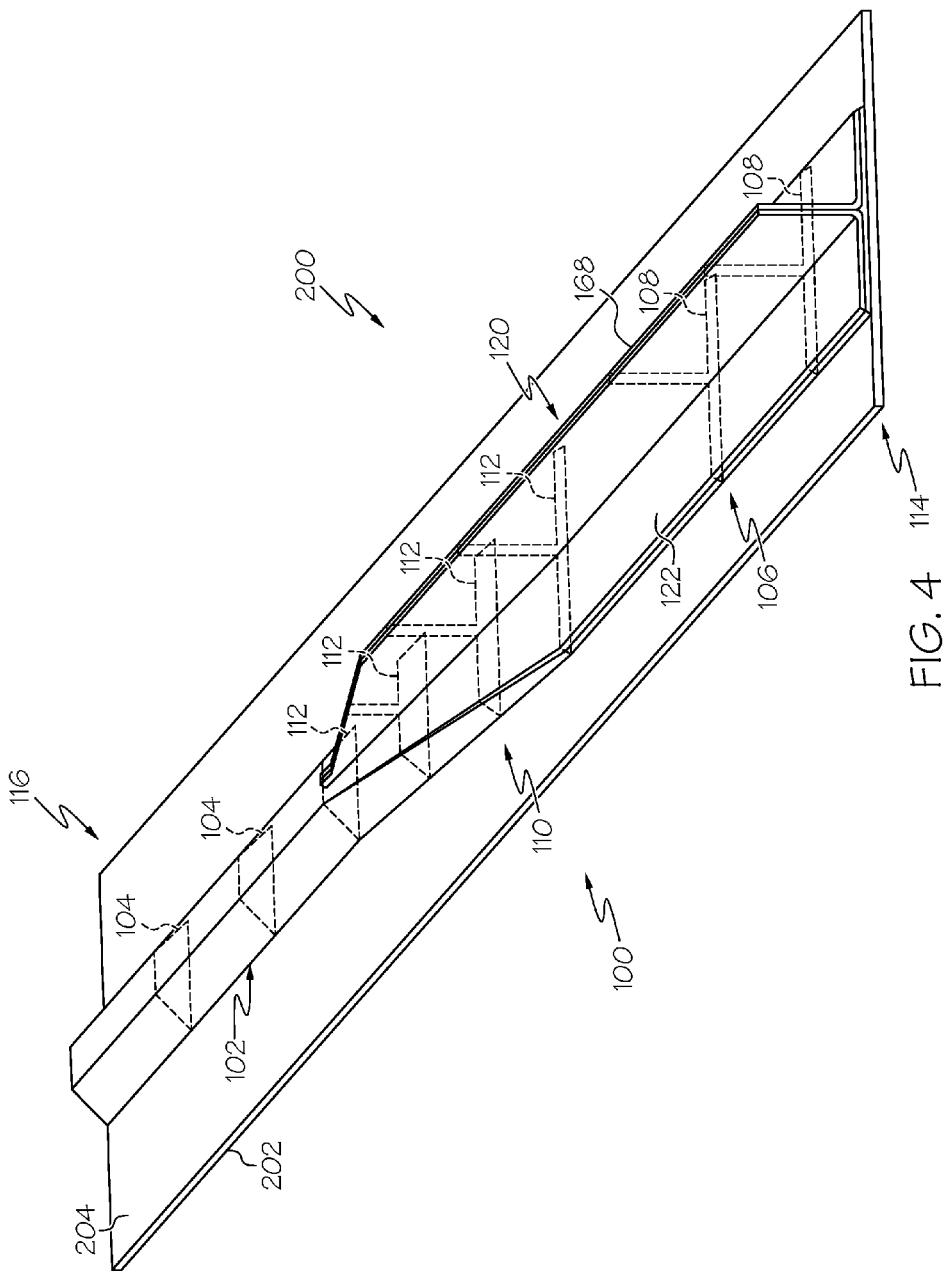
Figure 5:
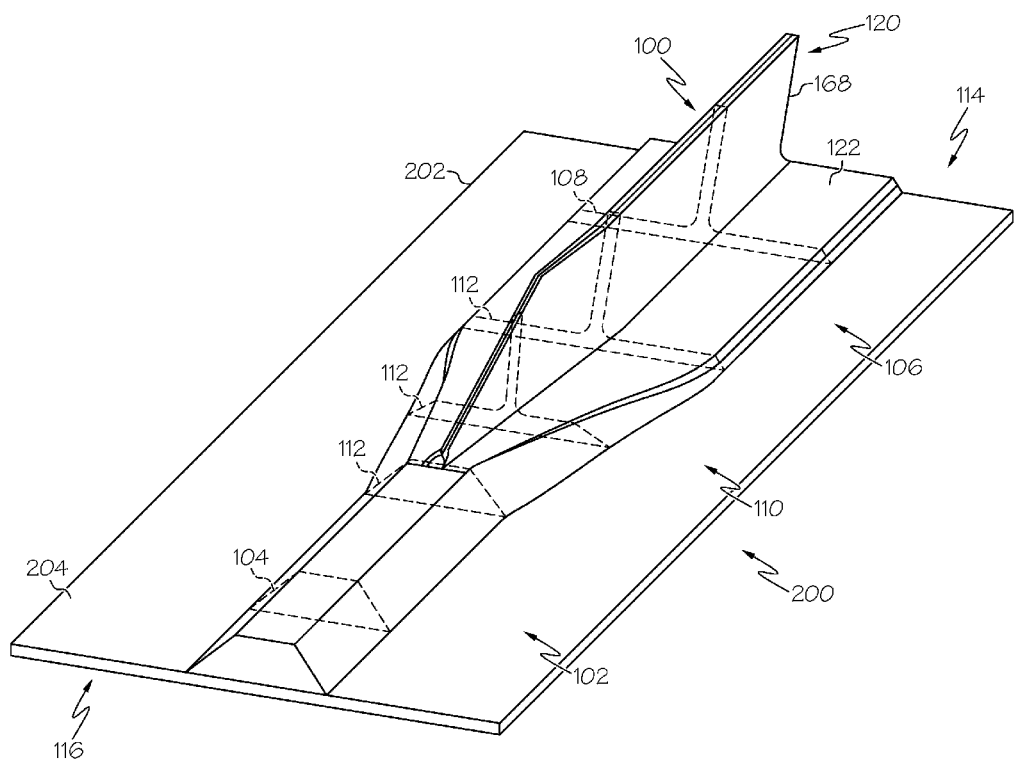
Figure 6:
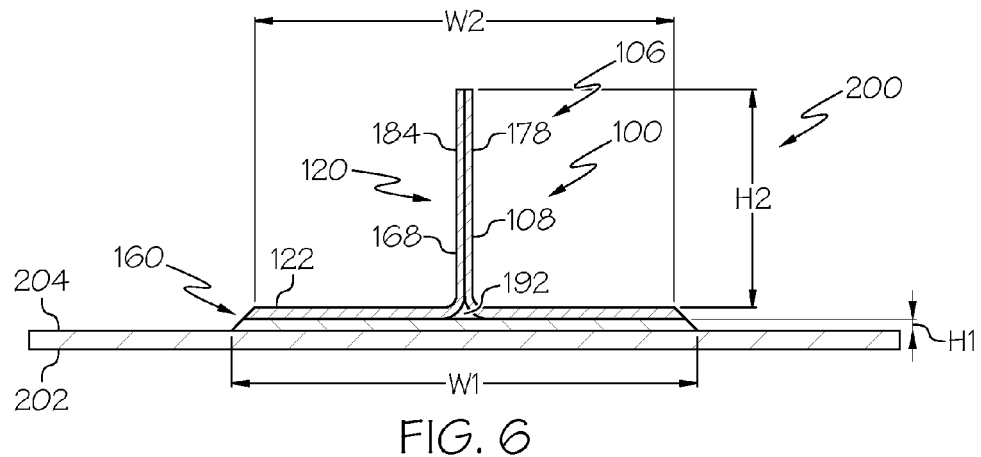
Figure 7:
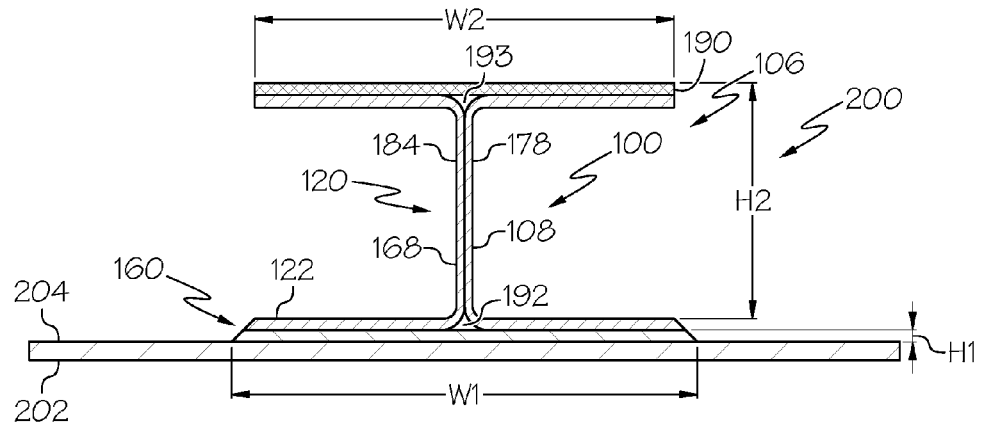
Figure 8:
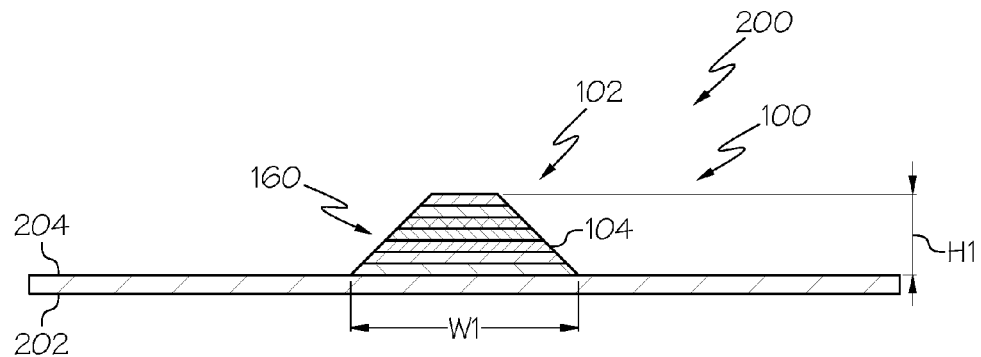
Figure 9:
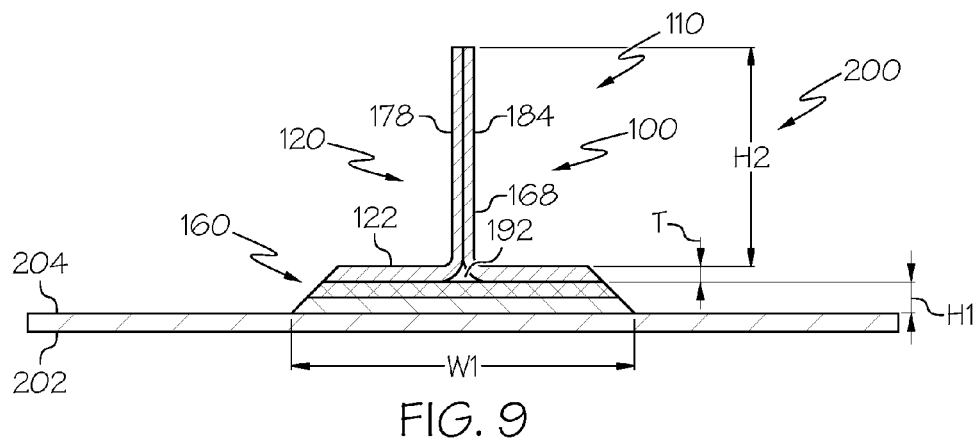
Figure 10:
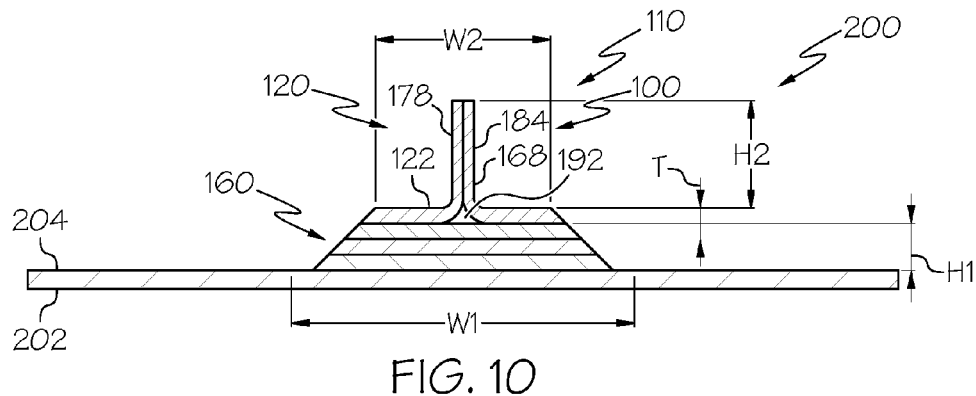
Figure 11:
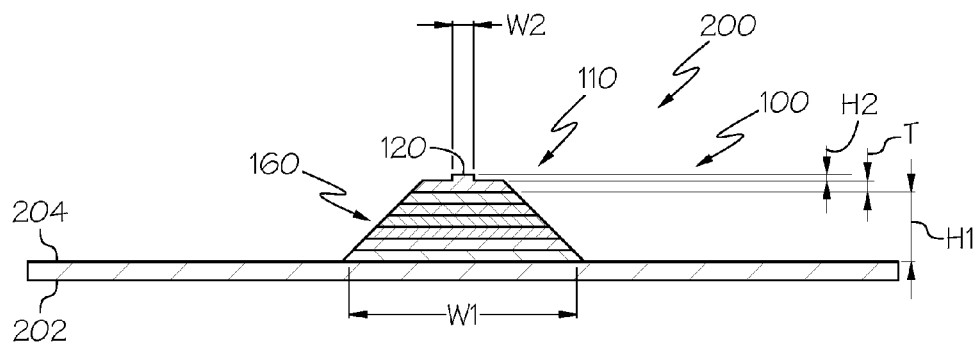
Figure 12:
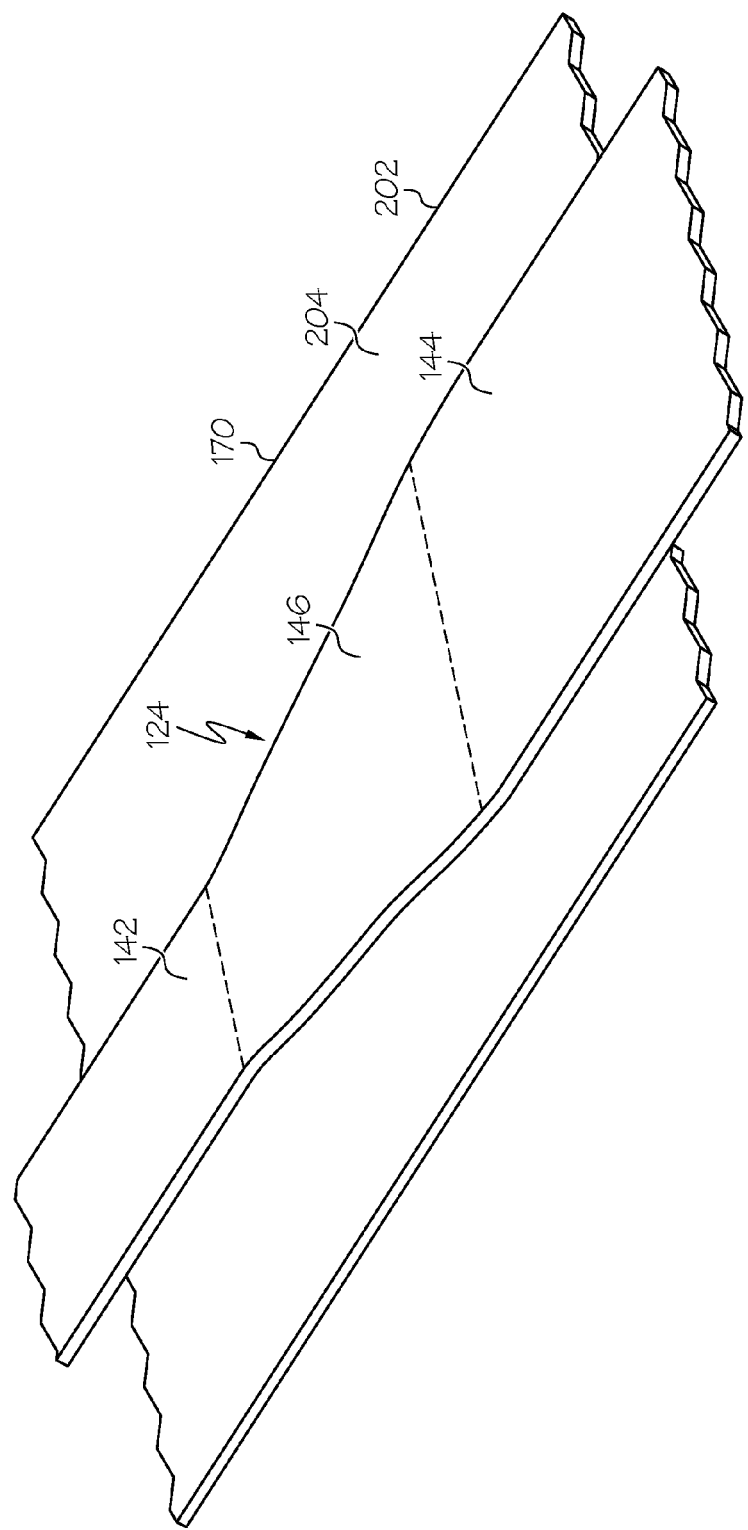
Figure 13:
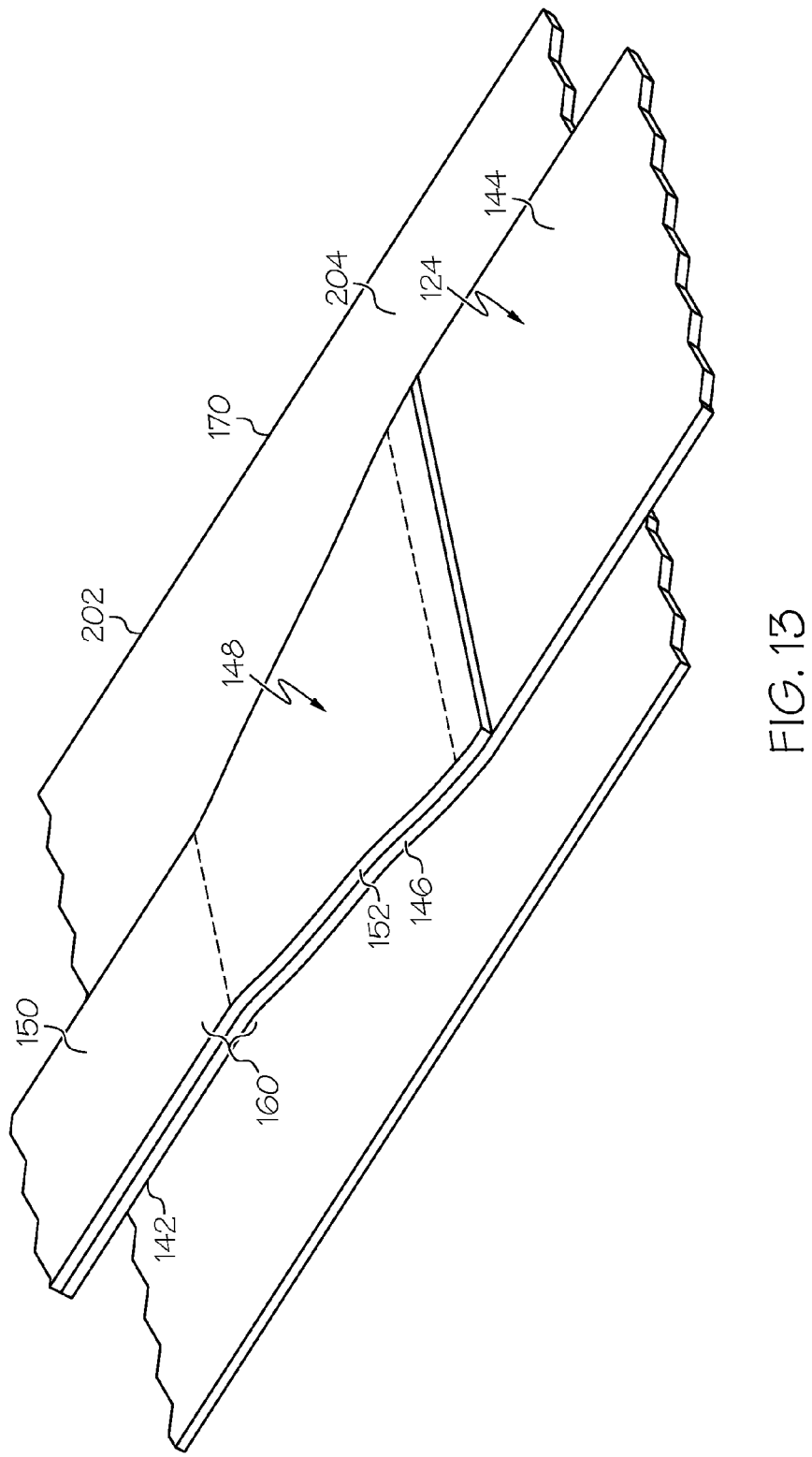
Figure 14:
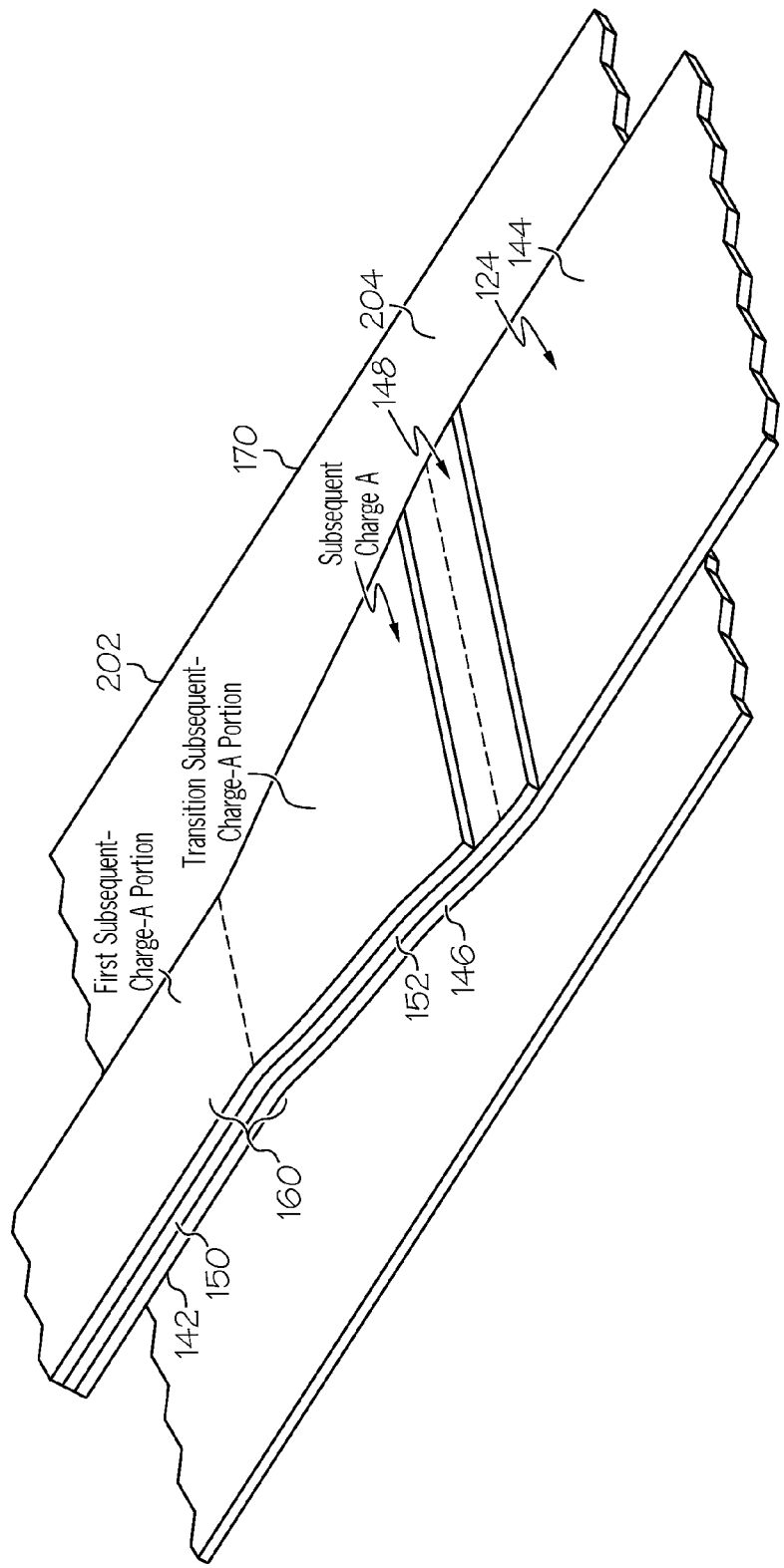
Figure 15:
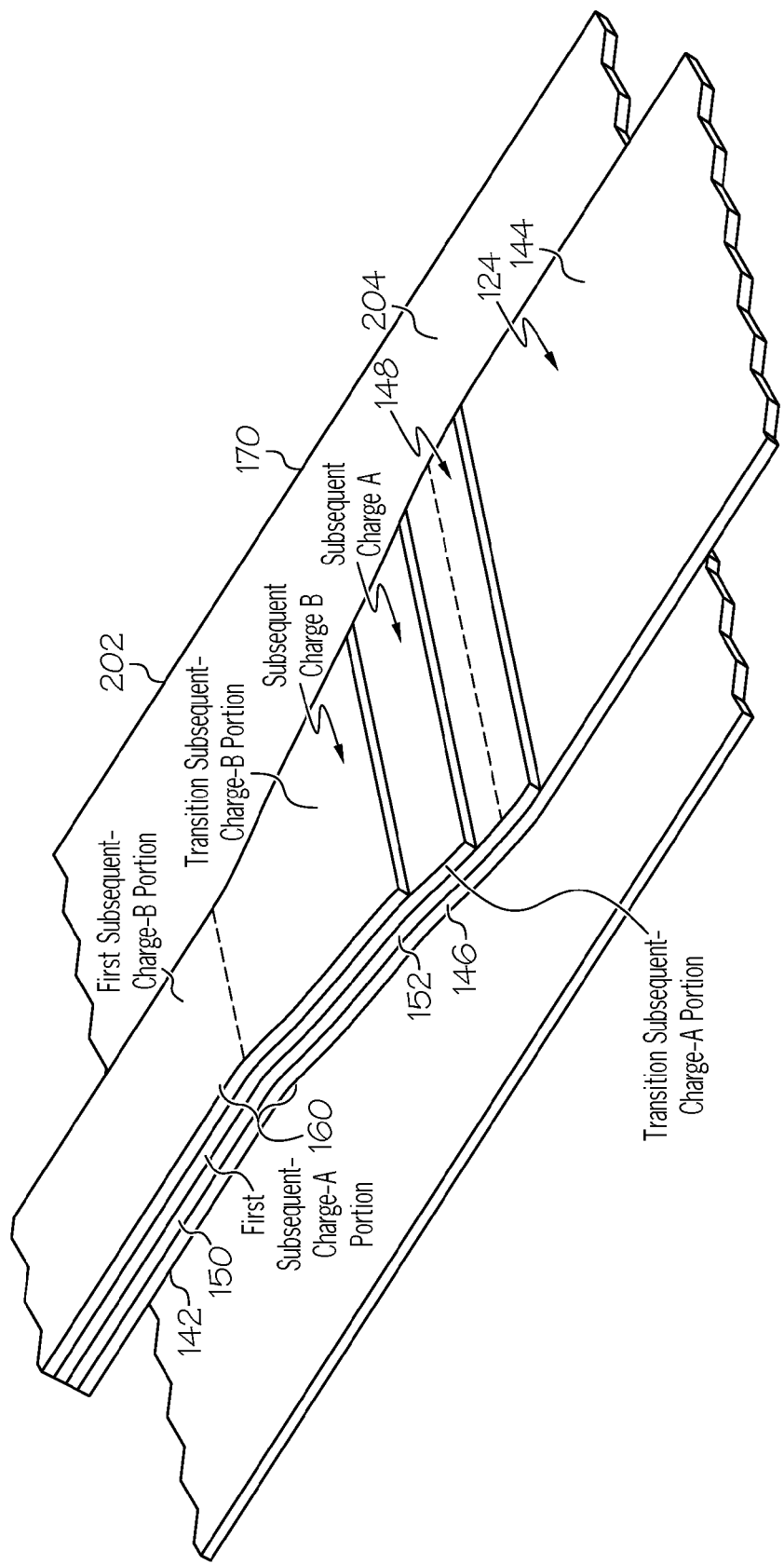
Figure 16:
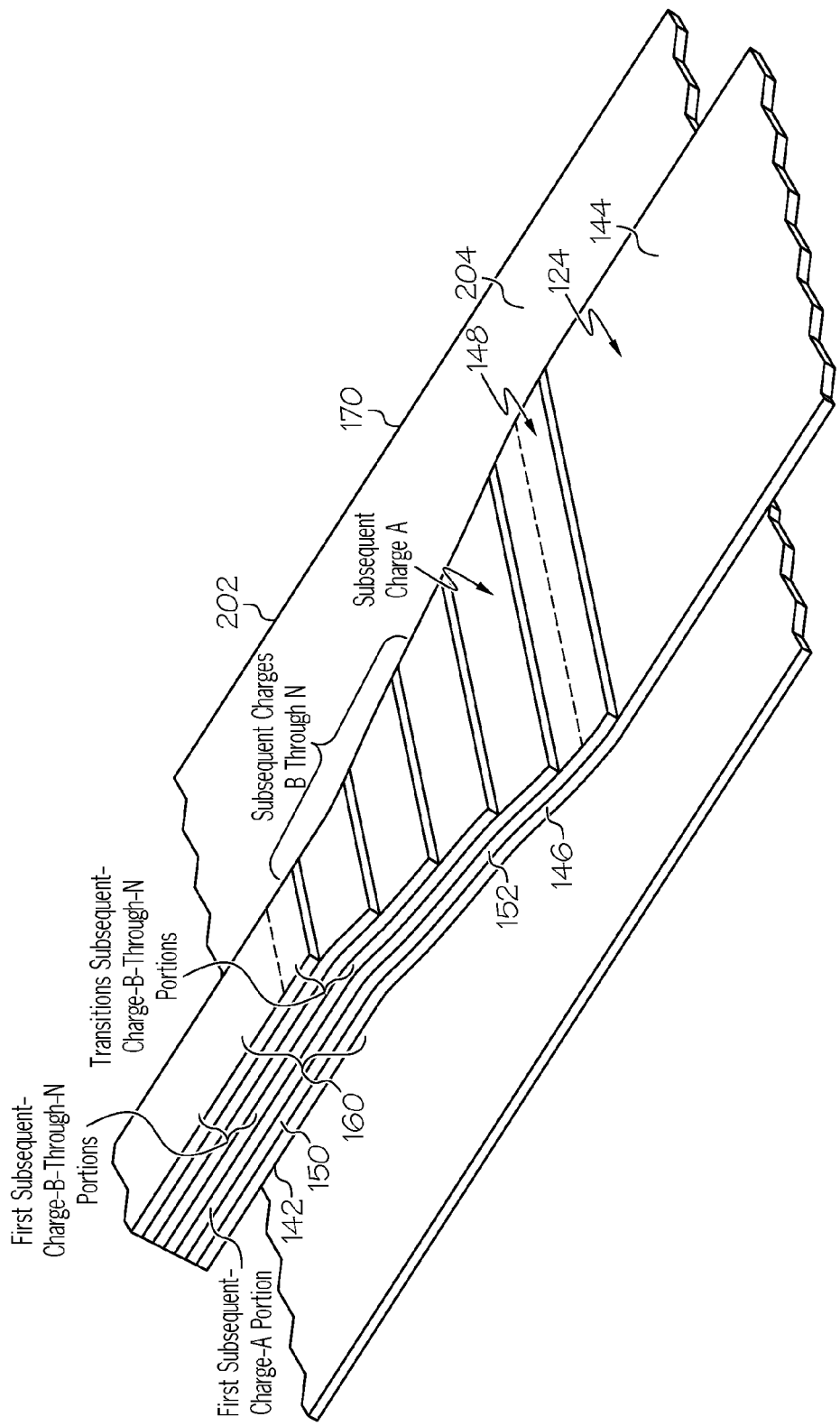
Figure 17:
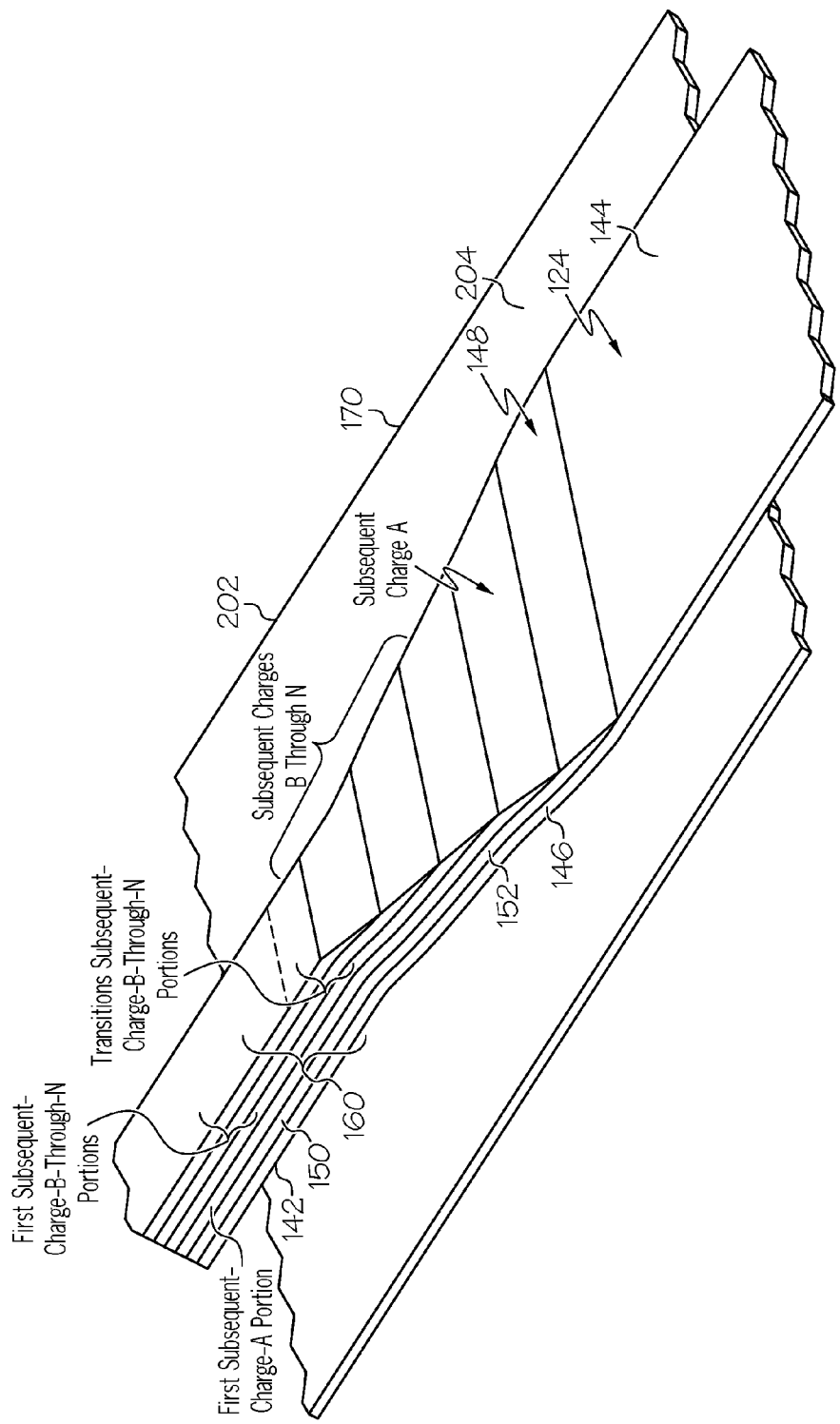
Figure 18:
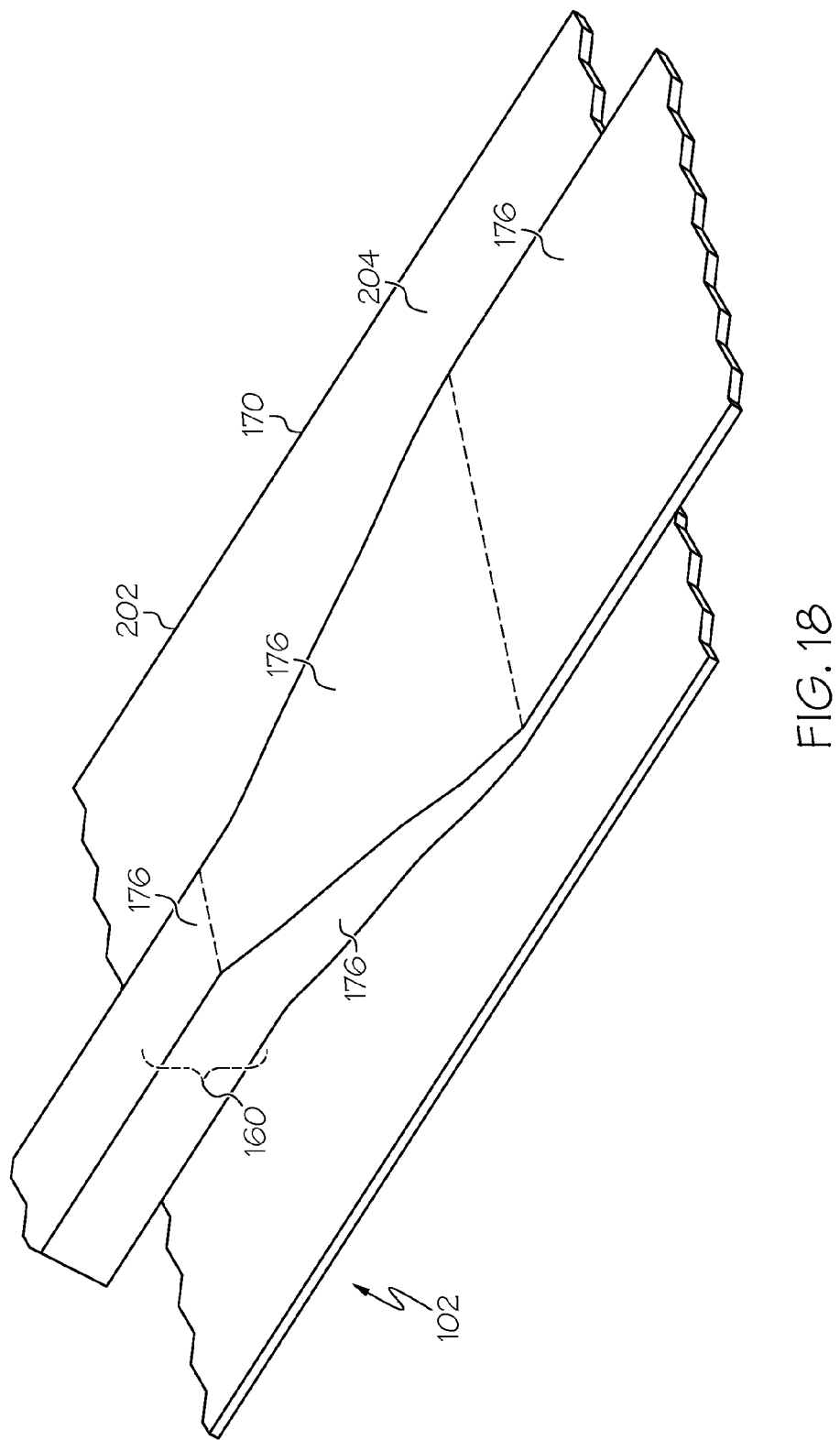
Figure 19:
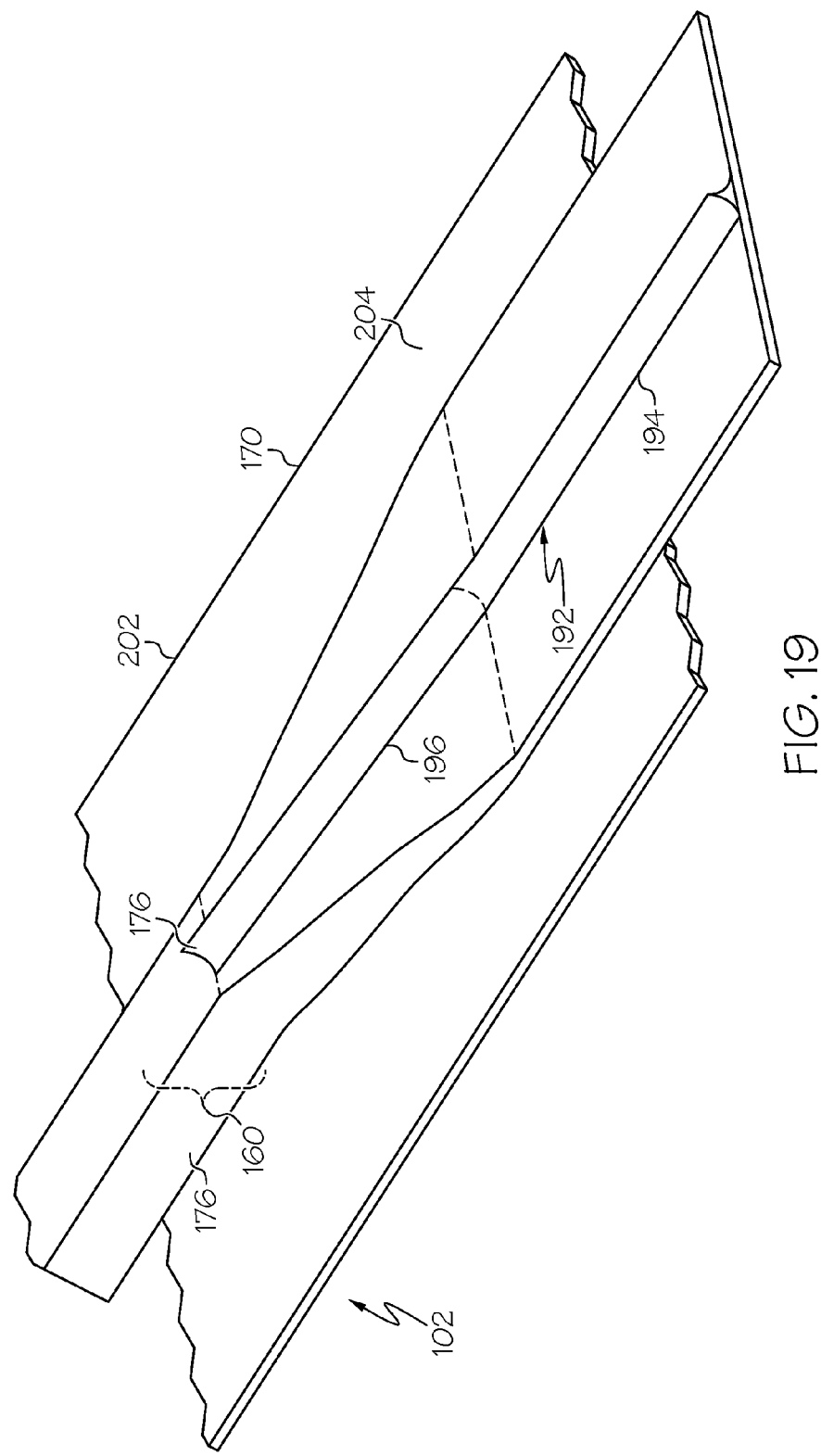
Figure 20:
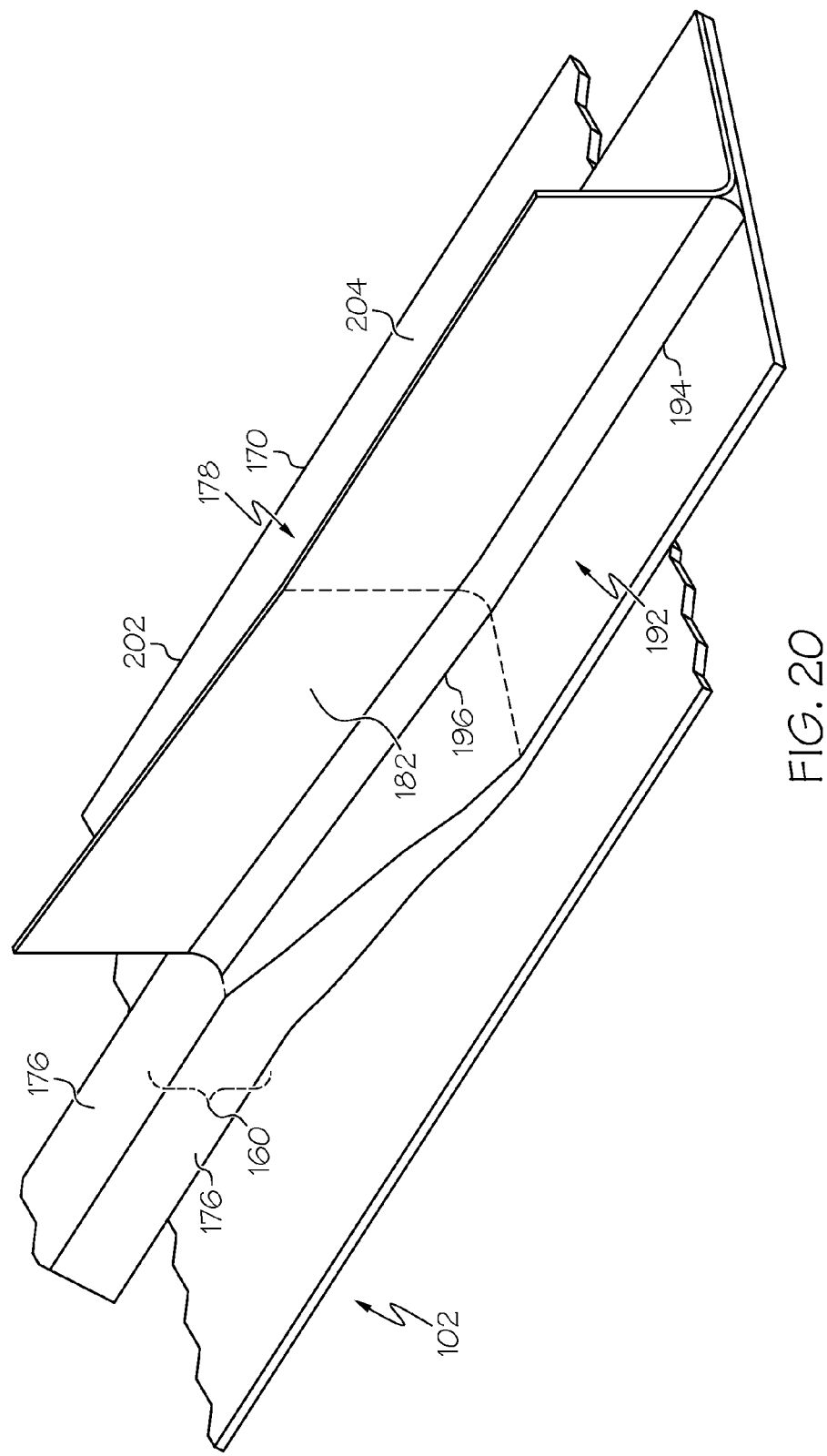
Figure 21:
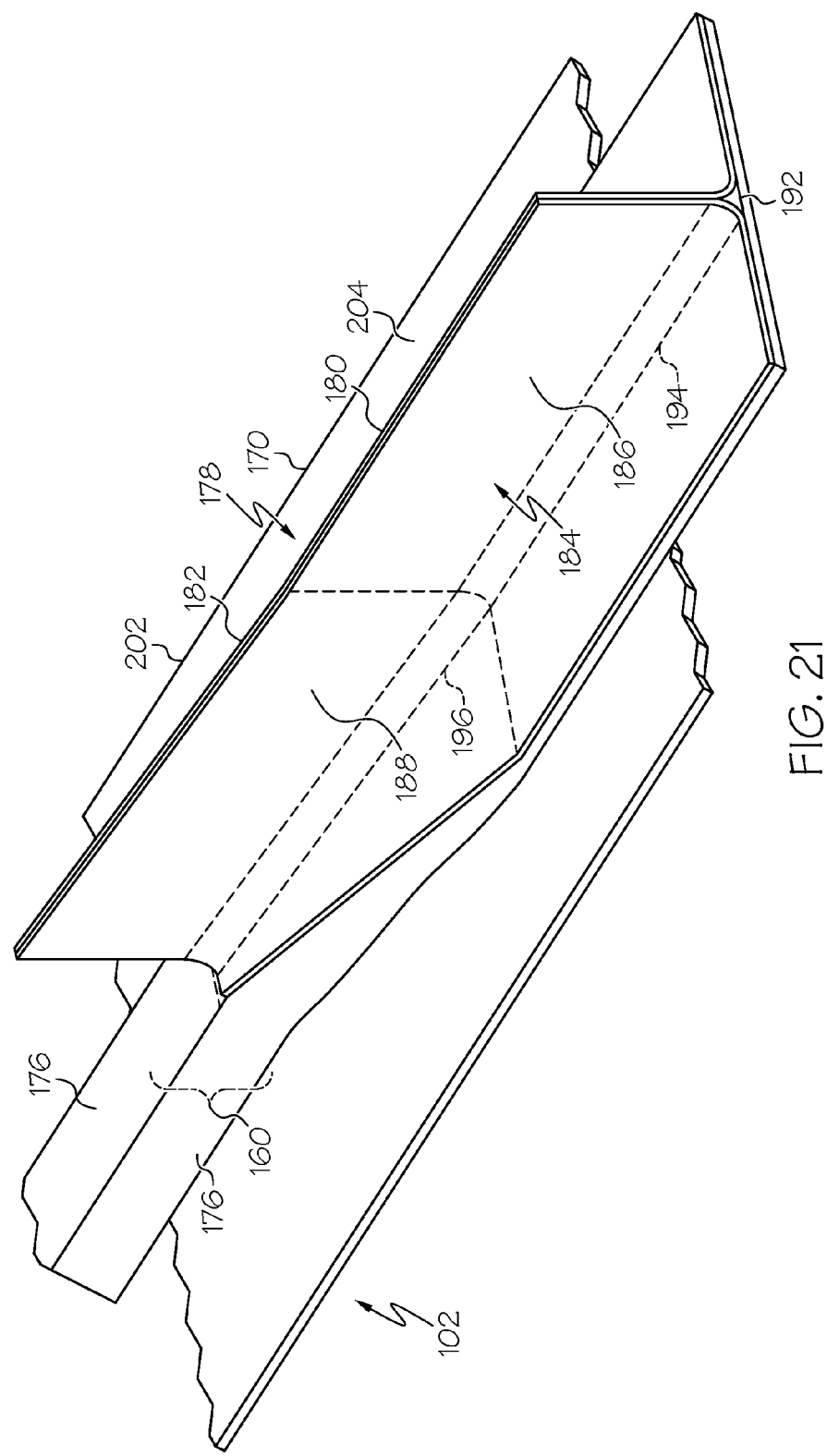
Figure 22:
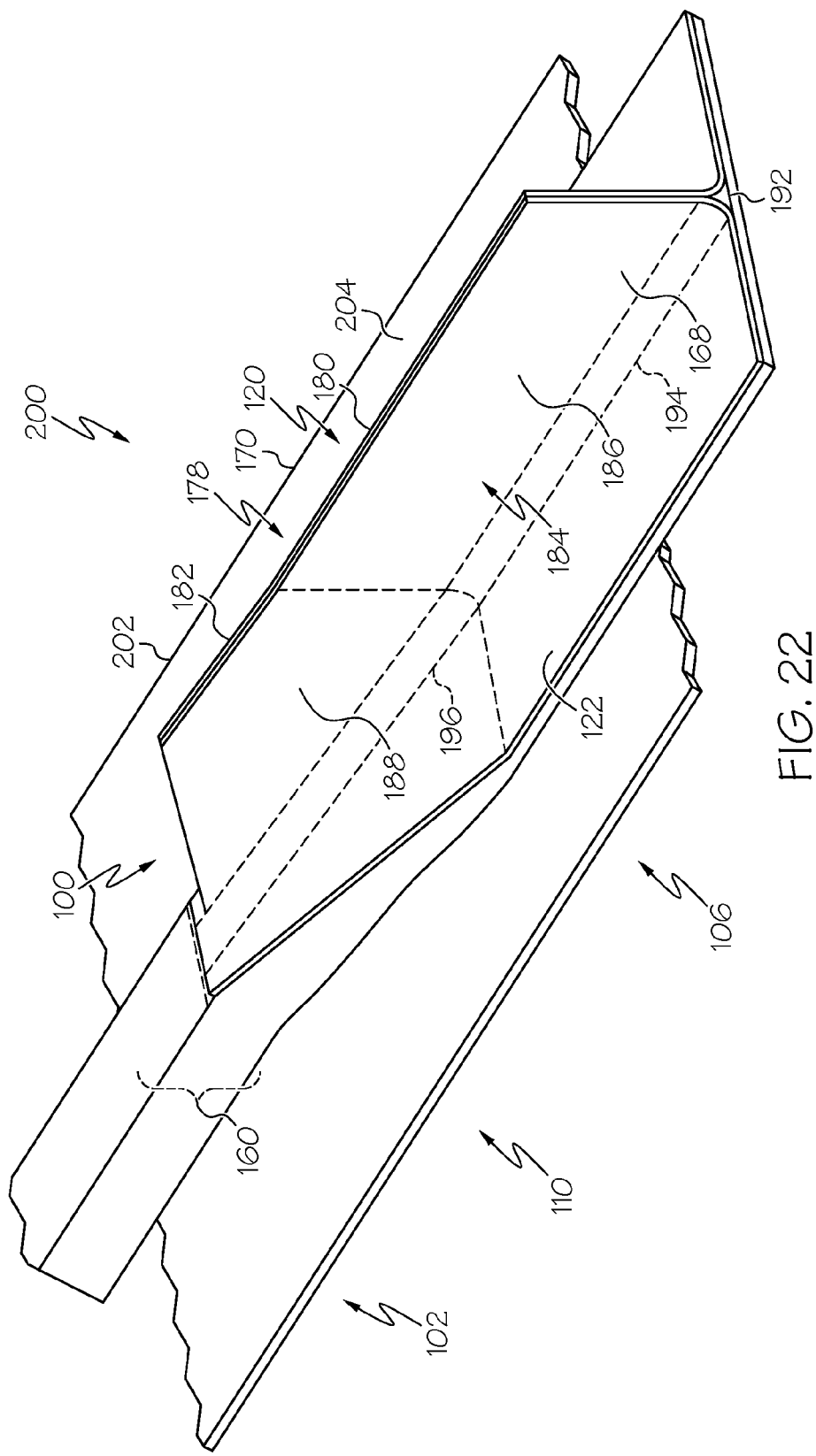
Figure 23:
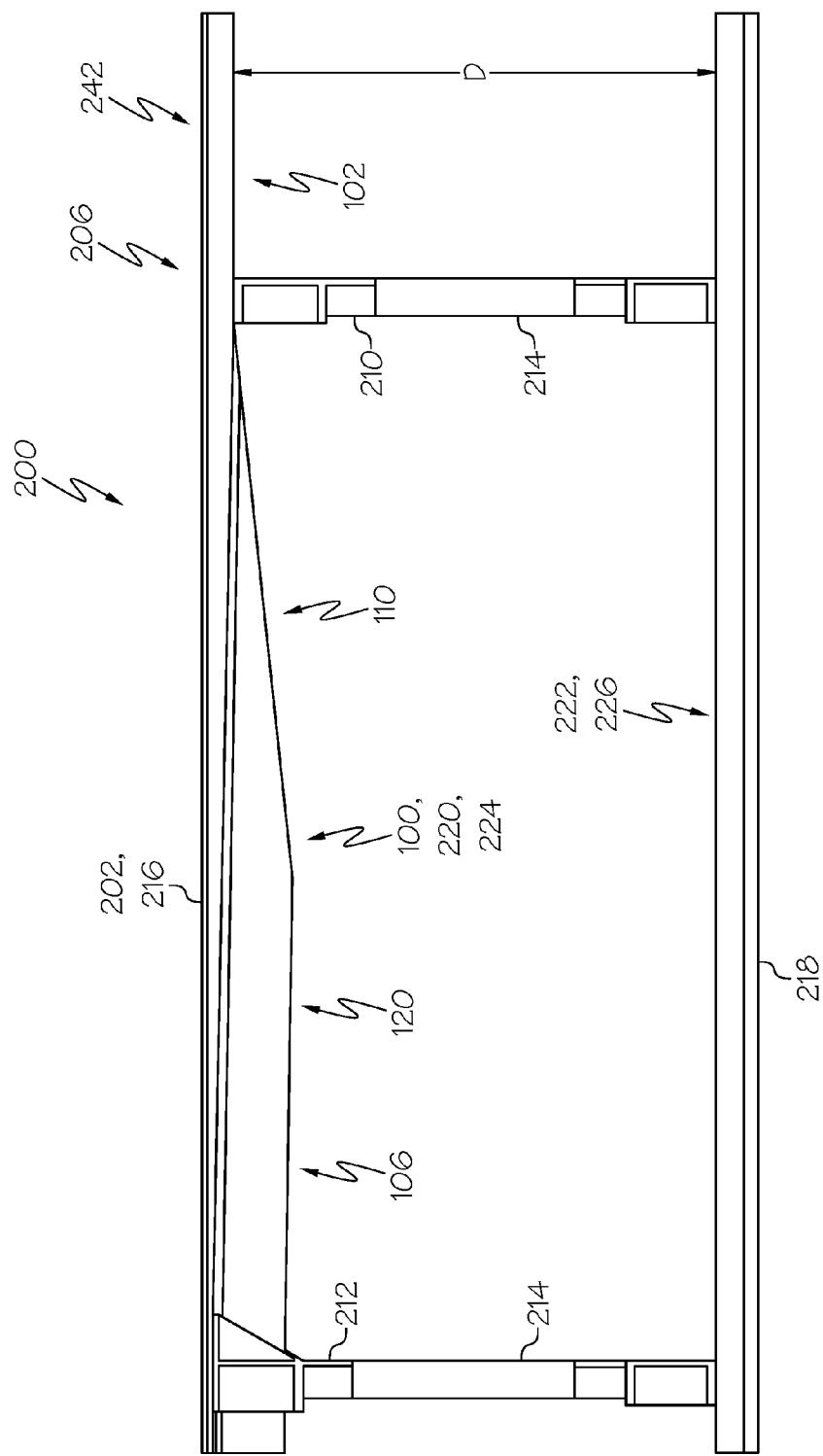
Figure 24:
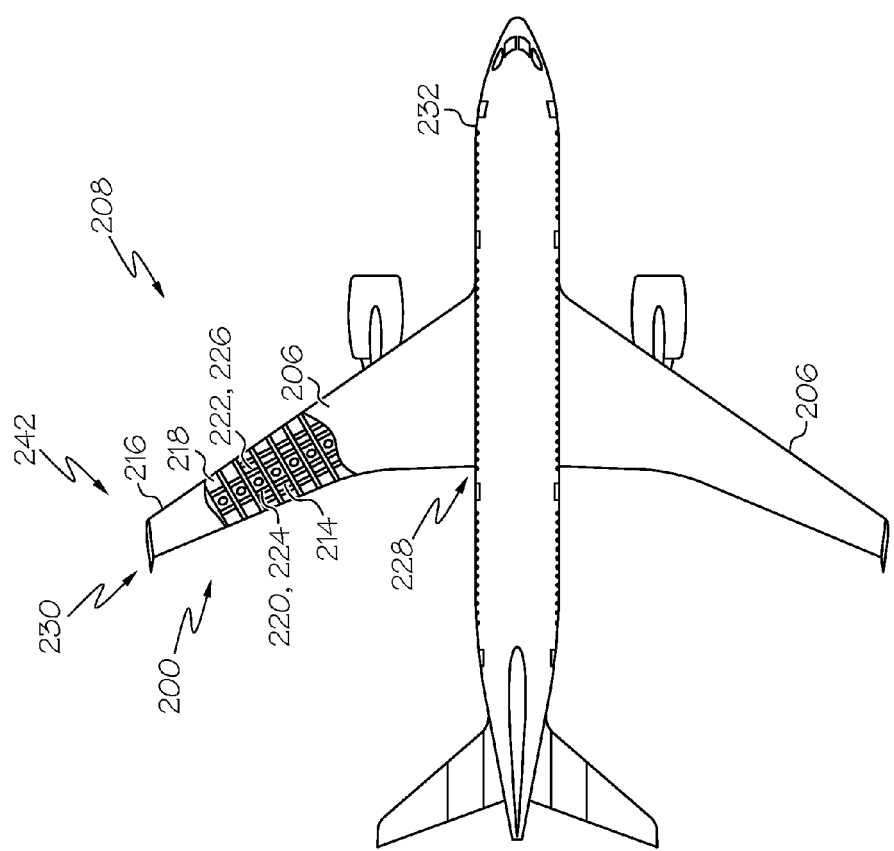
Figure 25A:
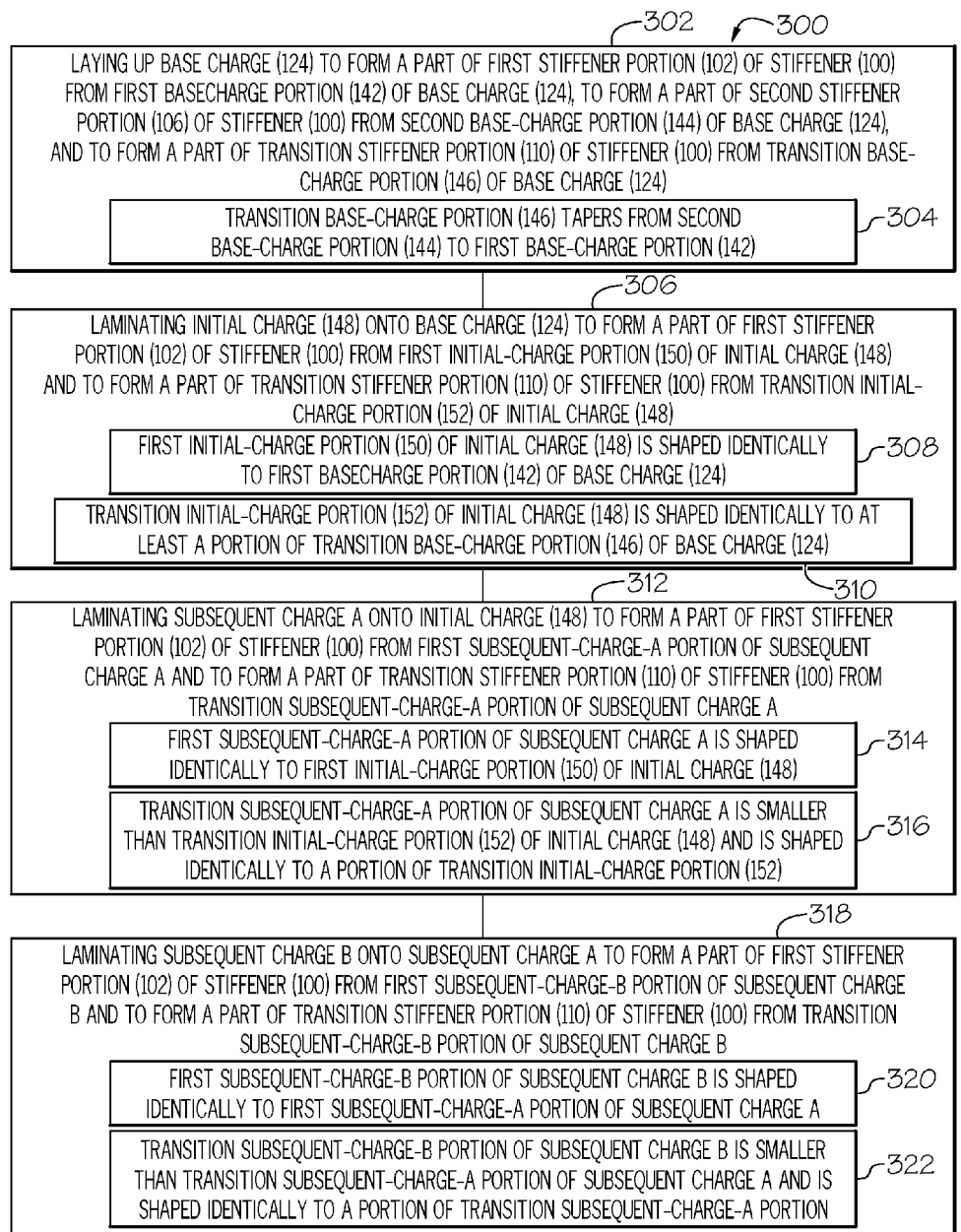
Figure 25B:
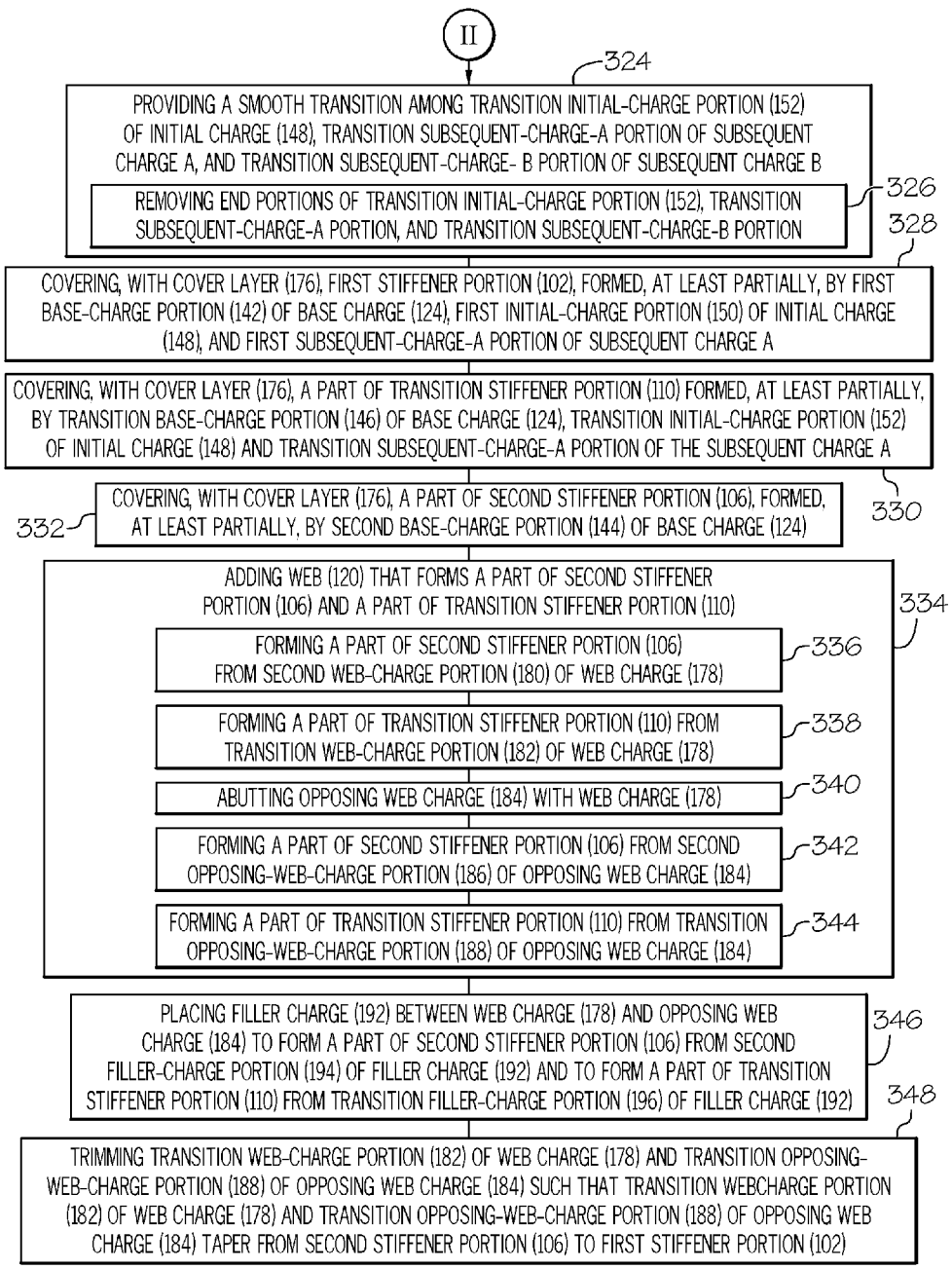
Figure 26:
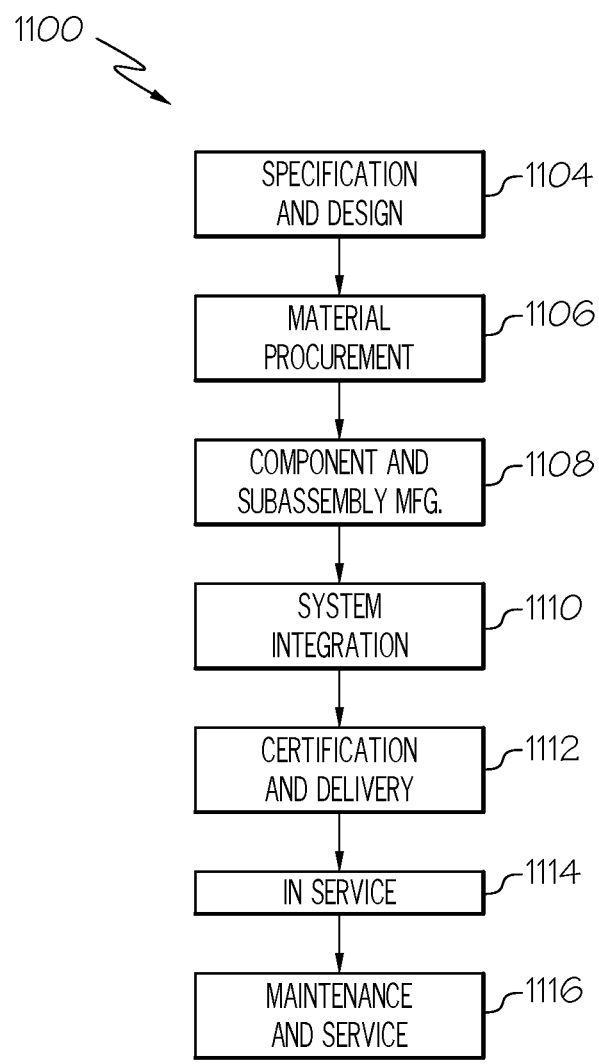

Having thus described examples of the present disclosure in general terms, reference will now be made to the accompanying drawings, which are not necessarily drawn to scale, and wherein like reference characters designate the same or similar parts throughout the several views, and wherein:

FIG. 1A is a first portion of a block diagram of a structure and a stiffener, according to one or more examples of the present disclosure;

FIG. 1B is a second portion of the block diagram of the structure and the stiffener, according to one or more examples of the present disclosure;

FIG. 2 is a schematic, side elevation view of the stiffener of FIGS. 1A and 1B, according to one or more examples of the present disclosure;

FIG. 3 is a schematic, top plan view of the stiffener of FIGS. 1A and 1B, according to one or more examples of the present disclosure;

FIG. 4 is a schematic, first end perspective view of the stiffener of FIGS. 1A and 1B, according to one or more examples of the present disclosure;

FIG. 5 is a schematic, second end perspective view of the stiffener of FIGS. 1A and 1B, according to one or more examples of the present disclosure;

FIG. 6 is a schematic, section view of a second stiffener portion of the stiffener of FIGS. 1A and 1B, according to one or more examples of the present disclosure;

FIG. 7 is a schematic, section view of the second stiffener portion of the stiffener of FIGS. 1A and 1B, according to one or more examples of the present disclosure;

FIG. 8 is a schematic, section view of a first stiffener portion of the stiffener of FIGS. 1A and 1B, according to one or more examples of the present disclosure;

FIG. 9 is a schematic, section view of a transition stiffener portion of the stiffener of FIGS. 1A and 1B, according to one or more examples of the present disclosure;

FIG. 10 is a schematic, section view of the transition stiffener portion of the stiffener of FIGS. 1A and 1B, according to one or more examples of the present disclosure;

FIG. 11 is a schematic, section view of the transition stiffener portion of the stiffener of FIGS. 1A and 1B, according to one or more examples of the present disclosure;

FIG. 12 is a schematic, perspective view of a base charge of the stiffener of FIGS. 1A and 1B, according to one or more examples of the present disclosure;

FIG. 13 is a schematic, perspective view of charges, including the base charge and an initial charge, of the stiffener of FIGS. 1A and 1B, according to one or more examples of the present disclosure;

FIG. 14 is a schematic, perspective view of the charges, including the base charge, the initial charge, and a subsequent charge A, of the stiffener of FIGS. 1A and 1B, according to one or more examples of the present disclosure;

FIG. 15 is a schematic, perspective view of the charges, including the base charge, the initial charge, the subsequent charge A, and a subsequent charge B, of the stiffener of FIGS. 1A and 1B, according to one or more examples of the present disclosure;

FIG. 16 is a schematic, perspective view of the charges, including the base charge, the initial charge, the subsequent charge A, and subsequent charges B through N of the stiffener of FIGS. 1A and 1B, according to one or more examples of the present disclosure;

FIG. 17 is a schematic, perspective view of a smooth transition of the charges, including the base charge, the initial charge, the subsequent charge A, and the subsequent charges B through N, of the stiffener of FIGS. 1A and 1B, according to one or more examples of the present disclosure;

FIG. 18 is a schematic, perspective view of a cover layer covering the charges of the stiffener of FIGS. 1A and 1B, according to one or more examples of the present disclosure;

FIG. 19 is a schematic, perspective view of the charges and a filler charge of the stiffener of FIGS. 1A and 1B, according to one or more examples of the present disclosure;

FIG. 20 is a schematic, perspective view of the charges, the filler charge and a web charge of the stiffener of FIGS. 1A and 1B, according to one or more examples of the present disclosure;

FIG. 21 is a schematic, perspective view of the charges, the filler charge, the web charge and an opposing web charge of the stiffener of FIGS. 1A and 1B, according to one or more examples of the present disclosure;

FIG. 22 is a schematic, perspective view of the charges and a web of the stiffener of FIGS. 1A and 1B, according to one or more examples of the present disclosure;

FIG. 23 is a schematic, side elevation view of the structure of FIGS. 1A and 1B, according to one or more examples of the present disclosure;

FIG. 24 is a schematic, top plan view of an aircraft comprising the structure of FIGS. 1A and 1B, according to one or more examples of the present disclosure;

FIG. 25A is a first portion of a block diagram of a method of making a stiffener, according to one or more examples of the present disclosure;

FIG. 25B is a second portion of a block diagram of a method of making the stiffener, according to one or more examples of the present disclosure;

FIG. 26 is a block diagram of aircraft production and service methodology; and

Figure 27:
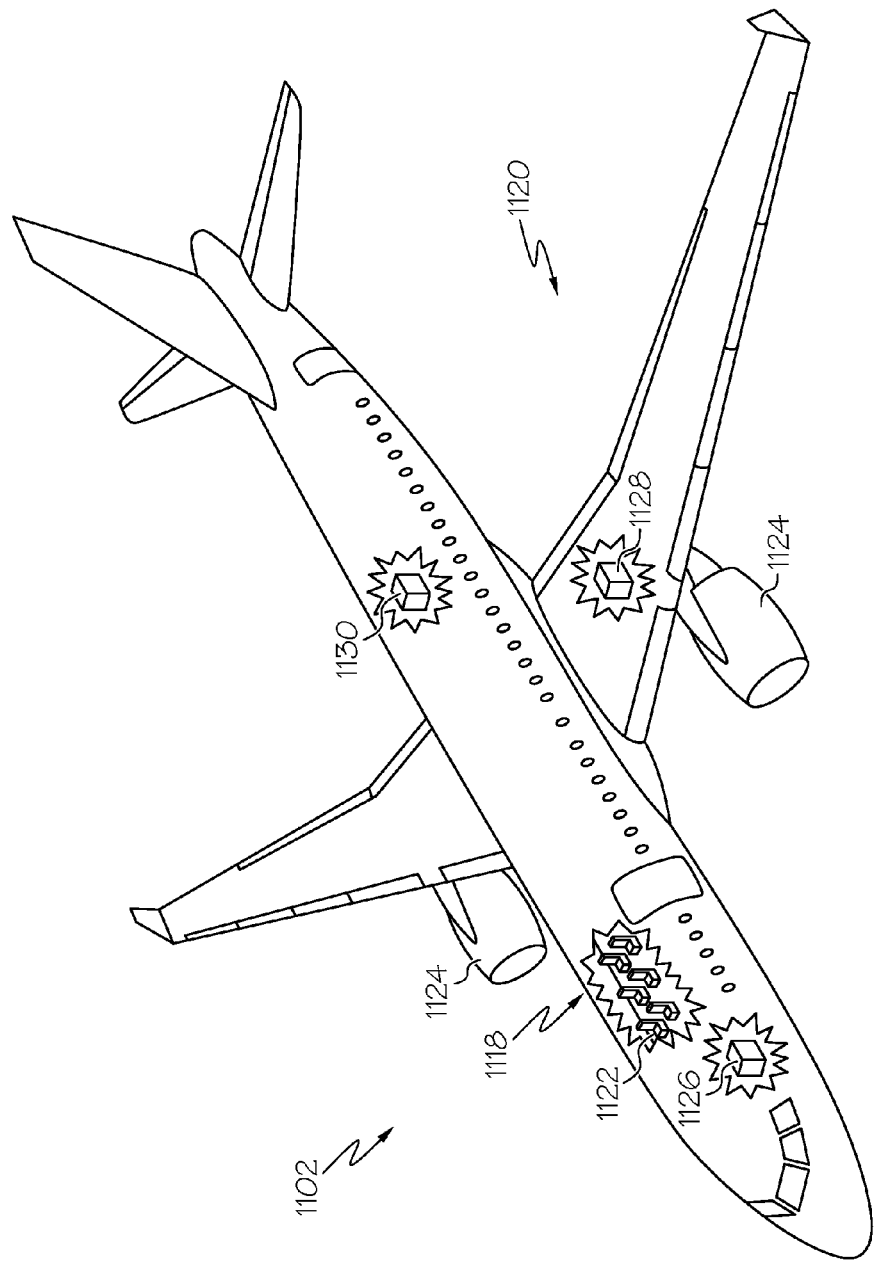

FIG. 27 is a schematic illustration of an aircraft.

DETAILED DESCRIPTION

In FIGS. 1A and 1B, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIGS. 1A and 1B may be combined in various ways without the need to include other features described in FIGS. 1A and 1B, other drawing figures, and/or the accompanying disclosure, even though such combination or combinations are not explicitly illustrated herein. Similarly, additional features not limited to the examples presented, may be combined with some or all of the features shown and described herein.

In FIGS. 25A, 25B and 26, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 25A, 25B and 26 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

Illustrative, non-exhaustive examples, which may or may not be claimed, of the subject matter according the present disclosure are provided below.

Referring, e.g., to FIGS. 1A, 1B, 2-5 and 22, stiffener 100, is disclosed. Stiffener 100 comprises first stiffener portion 102, having first cross-sectional profile 104 that is constant along first stiffener portion 102. Stiffener 100 also comprises second stiffener portion 106, having second cross-sectional profile 108 that is constant along second stiffener portion 106. Second cross-sectional profile 108 of second stiffener portion 106 is different from first cross-sectional profile 104 of first stiffener portion 102. Stiffener 100 further comprises transition stiffener portion 110, tapering from second stiffener portion 106 to first stiffener portion 102. The preceding subject matter of this paragraph characterizes example 1 of the present disclosure.

First stiffener portion 102 and second stiffener portion 106 enable a single continuous stiffener 100 to have different cross-sectional profiles and/or dimensions, which provide different structural characteristics, for example, size, shape and/or load bearing characteristics. Transition stiffener portion 110 effectively transfers a load between first stiffer portion 102 and second stiffener portion 106.

Gradually shifting (e.g., tapering) from first cross-sectional profile 104 of first stiffener portion 102 to second cross-sectional profile 108 of second stiffener portion 106 along transition stiffener portion 110 provides a more effective load transfer as compared to abutting, splicing or otherwise coupling two different stiffeners each having a different cross-sectional profile.

First cross-sectional profile 104 may have any suitable shape depending upon the particular structural application of stiffener 100, for example, when used to construct structure 200 (e.g., FIG. 1A). As one example, first cross-sectional profile 104 of first stiffener portion 102 may be designed to react to bending loads, such as wing bending loads experienced during flight. As one example, the bending loads are primarily tension-driven loads.

Similarly, second cross-sectional profile 108 may have any suitable shape (e.g., different than the shape of first cross-sectional profile 104) depending upon the particular structural application of stiffener 100, for example, when used to construct structure 200. As one example, second cross-sectional 108 of second stiffener portion 106 may be designed to react to bending loads, such as wing bending loads experienced during flight. As one example, the bending loads are primarily compression-driven loads.

As will be described in more detail below, as one example, stiffener 100 enables construction of aircraft wing 206 (e.g., FIG. 24), for example, an outboard portion of wing 206, having a relatively thin cross-sectional profile, which provides significant aerodynamic benefits, while allowing sufficient clearance between upper and lower stiffeners about the outboard portion.

Referring generally to FIGS. 1A and 1B and particularly to, e.g., FIGS. 4, 5, and 8, first cross-sectional profile 104 of first stiffener portion 102 is trapezoidally shaped. The preceding subject matter of this paragraph characterizes example 2 of the present disclosure, wherein example 2 also includes the subject matter according to example 1, above.

A trapezoidally shaped first cross-sectional profile 104 of first stiffener portion 102 of stiffener 100 enables first stiffener portion 102 to suitably react to bending loads primarily due to tension loading, while also providing a relatively short profile height.

When stiffener 100 is used to construct structure 200 (e.g., wing 206) (FIG. 1A), the trapezoidally shaped first cross-sectional profile 104 of first stringer portion 102 provides for an increase in the available clearance space between first stiffener portion 102 of stiffener 100 and an opposing structural component (e.g., an opposed stiffener).

When used in the construction of wing 206 of aircraft 208 (e.g., FIG. 24), the trapezoidally shaped first cross-sectional profile 104 of first stiffener portion 102 of stiffener 100 may also be known as a plank-type stringer.

Referring generally to FIGS. 1A and 1B and particularly to, e.g., FIGS. 4-6, second cross-sectional profile 108 of second stiffener portion 106 is T-shaped. The preceding subject matter of this paragraph characterizes example 3 of the present disclosure, wherein example 3 also includes the subject matter according to any one of examples 1 or 2, above.

A T-shaped second-cross sectional profile 108 of second stiffener portion 106 of stiffener 100 enables second stiffener portion 106 to suitably react to bending loads primarily due to compression loading, while also providing a relatively tall profile height and/or a high cross-sectional moment of inertia.

As used herein, the term "T-shaped" refers to a shaped member having a first (e.g., substantially vertical) portion and a second (e.g., substantially horizontal) portion substantially perpendicularly coupled to an end of the first portion. The second portion extends laterally outward in opposite directions, for example, equidistantly, from the end of the first portion.

When used in the construction of wing 206 of aircraft 208 (e.g., FIG. 24), the T-shaped second cross-sectional profile 108 of second stiffener portion 106 of stiffener 100 may also be known as a blade-type stringer.

Referring generally to FIGS. 1A and 1B and particularly to, e.g., FIG. 7, second cross-sectional profile 108 of second stiffener portion 106 is I-shaped. The preceding subject matter of this paragraph characterizes example 4 of the present disclosure, wherein example 4 also includes the subject matter according to any one of examples 1 or 2, above.

An I-shaped second cross-sectional profile 108 of second stiffener portion 106 of stiffener 100 enables second stiffener portion 106 to suitably react to bending loads primarily due to compression loading, while also providing a relatively tall profile height and/or a high cross-section moment of inertia.

As used herein, the term "I-shaped" refers to a shaped member having a first (e.g., substantially vertical) portion, a second (e.g., substantially horizontal) portion substantially perpendicularly coupled to a first end of the first portion, and a third (e.g., substantially horizontal) portion substantially perpendicularly coupled to a second end (opposite the first end) of the first portion. The second portion extends laterally outward in opposite directions, for example, equidistantly, from the first end of the first portion. The third portion extends laterally outward in opposite directions, for example, equidistantly, from the second end of the first portion.

When used in the construction of wing 206 of aircraft 208 (e.g., FIG. 24), the I-shaped second cross-sectional profile 108 of second stiffener portion 106 of stiffener 100 may also be known as an I-type stringer.

Referring generally to FIGS. 1A, 1B, 2 and 3 and particularly to, e.g., FIGS. 4, 5 and 9-11, transition stiffener portion 110 comprises transition cross-sectional profiles 112. Transitional cross-sectional profiles 112 of transition stiffener portion 110 are different from first cross-sectional profile 104 of first stiffener portion 102 and second cross-sectional profile 108 of second stiffener portion 106. The preceding subject matter of this paragraph characterizes example 5 of the present disclosure, wherein example 5 also includes the subject matter according to any one of examples 1-4, above.

Transition cross-sectional profiles 112 of transition stiffener portion 110 gradually shifting (e.g., transitioning) from first cross-sectional profile 104 of first stiffener portion 102 to second cross-sectional profile 108 of second stiffener portion 106 to provides effective load transfer between first stiffener portion 102 and second stiffener portion 106 through transition stiffener portion 110.

Each one of transition cross-sectional profiles 112 of transition stiffener portion 110 has a shape representing a transformation between first cross-sectional profile 104 of first stiffener portion 102 and second cross-sectional profile 108 of second stiffener portion 106. Transition cross-sectional profiles 112 proximate (e.g., at or near) first stiffener portion 102 have shapes approximating first cross-sectional profile 104. Similarly, transition cross-sectional profiles 112 proximate (e.g., at or near) second stiffener portion 106 have shapes approximating second cross-sectional profile 108.

As one example, and as best illustrated in FIGS. 4 and 5, transition cross-sectional profiles 112 have shapes transitioning between a trapezoidal shape (e.g., first cross-sectional profile 104) and a T-shape (e.g., second cross-sectional profile 108).

Referring generally to FIGS. 1A and 1B and particularly to, e.g., FIGS. 2-5 and 9-11, all of transitional cross-sectional profiles 112 of transition stiffener portion 110 are different. The preceding subject matter of this paragraph characterizes example 6 of the present disclosure, wherein example 6 also includes the subject matter according to example 5, above.

All of transition cross-sectional profiles 112 of transition stiffener portion 110 being different provide a consistent and continual transition (e.g., ramp rate) between first cross-sectional profile 104 of first stiffener portion 102 and second cross-sectional profile 108 of second stiffener portion 106 (e.g., from second cross-sectional profile 108 of second stiffener portion 106 to first cross-sectional profile 104 of first stiffener portion 102 or from first cross-sectional profile 104 of first stiffener portion 102 to second cross-sectional profile 108 of second stiffener portion 106).

Referring generally to FIGS. 1A and 1B and particularly to, e.g., FIGS. 2-5 and 9-11, transition cross-sectional profiles 112 smoothly transition from second cross-sectional profile 108 of second stiffener portion 106 to first cross-sectional profile 104 of first stiffener portion 102. The preceding subject matter of this paragraph characterizes example 7 of the present disclosure, wherein example 7 also includes the subject matter according to example 6, above.

A smooth transition between first cross-sectional profile 104 and second cross-sectional profile 108 along transition cross-sectional profiles 112 gradually changes the centroid of stiffener 100 and reduces the potential of stiffener 100 pulling off of a panel to which it is coupled.

Abrupt changes to the centroid of stiffener 100 may increase the potential of stiffener 100 pulling away from the panel to which it is coupled. The smooth transition of transition cross-sectional profiles 112 of transition stiffener portion 110 between first cross-sectional profile 104 of first stiffener portion 102 and second cross-sectional profile 108 of second stiffener portion 106 (e.g., from second cross-sectional profile 108 of second stiffener portion 106 to first cross-sectional profile 104 of first stiffener portion 102 or from first cross-sectional profile 104 of first stiffener portion 102 to second cross-sectional profile 108 of second stiffener portion 106) more effectively transfers loads between first stiffener portion 102 and second stiffener portion 106.

Referring generally to FIGS. 1A and 1B and particularly to, e.g., FIGS. 6-11 and 13-22, stiffener 100 further comprises charges 160 laminated together to form first stiffener portion 102, a part of second stiffener portion 106, and a part of transition stiffener portion 110. The preceding subject matter of this paragraph characterizes example 8 of the present disclosure, wherein example 8 also includes the subject matter according to any one of examples 1-7, above.

Charges 160 that are stacked and laminated together form an integral, continuous part of stiffener 100 capable of effectively transferring loads between first stiffener portion 102 and second stiffener portion 106 along transition stiffener portion 110.

Charges 160 may be formed from a composite material. For example, the composite material may include reinforcing fibers and resins. As one example, each of charges 160 may be a carbon fiber composite. Types of carbon fiber composites used to form charges 100 include pre-impregnated ("prepreg") thermoset composite, dry fiber thermoset composite, and thermoplastic composite. The laminated stack of charges 160 may be cured (e.g., co-cured) to form first stiffener portion 102, the part of second stiffener portion 106, and the part of transition stiffener portion 110.

As used herein, the terms laminated, laminating, etc. generally refer to overlaying, stacking, bundling, arranging, placing or otherwise positioning one or more layers relative to one or more additional layers and, optionally, securing those layers together.

As one example, and as best illustrated in FIGS. 6-11, each one of charges 160 may have a trapezoidal cross-sectional shape. First stiffener portion 102 is formed from a trapezoidal stack of charges 160. The part of second stiffener portion 106 is formed from a trapezoidal stack of charges 160. The part of transition stiffener portion 110 is formed from a trapezoidal stack of charges 160.

A different number of charges 160 are used to form each of first stiffener portion 102, second stiffener portion 106, and transition stiffener portion 110. As one example, a fewer number of charges 160 are used to form the part of second stiffener portion 106 and a greater number of charges 160 are used to form first stiffener portion 102. The number of charges 160 used to from the part of transition stiffener portion 110 increases from the fewer number (e.g., of the second stiffener portion 106) to the greater number (e.g., of the first stiffener portion 102).

Any suitable number of charges 160 may be used to form first stiffener portion 102, the part of second stiffener portion 106, and the part of transition stiffener portion 110. As one example, and as best illustrated in FIGS. 6-11, five charges 160 may be used. As one example, and as best illustrated in FIG. 15, four charges 160 may be used. As one example, and as best illustrated in FIG. 16, seven charges 160 may be used. Additional charges may also be used without limitation.

As one specific example, and as best illustrated in FIG. 16, one of charges 160 (e.g., base charge 126) may form the part of second stiffener portion 106. One of charges 160 and another one of charges 160 (e.g., initial charge 148) may form one portion of the part of transition stiffener portion 110. One of charges 160, another one of charges 160, and yet another one of charges 160 (e.g., subsequent charge A) may form another portion of the part of transition stiffener portion 110. One of charges 160, another one of charges 160, yet another one of charges 160, and additional ones of charges 160 (e.g., subsequent charges B through N) may form additional portions of the part of transition stiffener portion 110. One of charges 160, another one of charges 160, yet another one of charges 160, and additional ones of charges 160 may form first stiffener portion 102.

Referring to FIGS. 1A and 1B, stiffener 100 further comprises prepreg composite plies 126 laminated together to form each one of charges 160. Prepreg composite plies 126 comprise reinforcement fibers 240. Reinforcement fibers 240 of approximately fifty percent of prepreg composite plies 126 are parallel to a primary load direction of stiffener 100. Reinforcement fibers 240 of approximately forty percent of prepreg composite plies 126 are at forty-five degrees to the primary load direction of stiffener 100. Reinforcement fibers 240 of approximately ten percent of prepreg composite plies 126 are perpendicular to the primary load direction of stiffener 100. The preceding subject matter of this paragraph characterizes example 9 of the present disclosure, wherein example 9 also includes the subject matter according to example 8, above.

Varying and/or alternating the orientation of reinforcing fibers 240 among prepreg composite plies 126, with respect to a longitudinal axis of each one of charges 160, at a plurality of different angles, such as approximate angles of 0-degrees, −45-degrees, 90-degrees, and 45-degrees, produces optimum mechanical properties (e.g., strength and/or stiffness) in charges 160 and stiffener 100 formed from charges 160.

Prepreg composite plies 126 may correspond to an uncured configuration of plies forming each one of charges 160, which when cured may form first stiffener portion 102, part of second stiffener portion 106, and part of transition stiffener portion 110. For example, prepreg composite plies 126 may correspond to a plurality of generally planar carbon fiber prepreg plies with various angular orientations. Each of prepreg composite plies 126 is stronger along the direction of orientation of reinforcing fibers 240 and weaker in a direction perpendicular to reinforcing fibers 240.

As described above, a stacked and laminated plurality of prepreg composite plies 126 forms each one of charges 160 and a stacked and laminated plurality of charges 160 form a part of stiffener 110 (e.g., first stiffener portion 102, the part of second stiffener portion 106, and the part of transition stiffener portion 110). As one example, each one of charges 160 may include twenty-two (22) prepreg composite plies 126. Prepreg composite plies 126 may have various angular orientations of reinforcing fibers 240.

Listed below in Table 1 is one example of a configuration of prepreg composite plies 126 (identified as P1 through P22) used to form a first group of charges 160 used to form the part of stiffener 100 and Table 2 is one example of a configuration of prepreg composite plies (identified as P1 through P22) used to form a second group of charges 160 used to form the part of stiffener 100.

TABLE 1

| PLY | ORIENTATION |
| --- | --- |
| 1 | 0 |
| 2 | 45 |
| 3 | 0 |
| 4 | 0 |
| 5 | −45 |
| 6 | 90 |
| 7 | 45 |
| 8 | 0 |
| 9 | 0 |
| 10 | −45 |
| 11 | 0 |
| 12 | 0 |
| 13 | 45 |
| 14 | 0 |
| 15 | 0 |
| 16 | −45 |
| 17 | 90 |
| 18 | 45 |
| 19 | 0 |
| 20 | 0 |
| 21 | −45 |
| 22 | 0 |

TABLE 2

| PLY | ORIENTATION |
| --- | --- |
| 1 | 0 |
| 2 | −45 |
| 3 | 0 |
| 4 | 0 |
| 5 | 45 |
| 6 | 90 |
| 7 | −45 |
| 8 | 0 |
| 9 | 0 |
| 10 | 45 |
| 11 | 0 |
| 12 | 0 |
| 13 | −45 |
| 14 | 0 |
| 15 | 0 |
| 16 | 45 |
| 17 | 90 |
| 18 | −45 |
| 19 | 0 |
| 20 | 0 |
| 21 | 45 |
| 22 | 0 |

As one example, seven charges 160 may be used to form the part of stiffener 100. Table 1 illustrates the orientation of reinforcing fibers 240 of prepreg composite plies 126 used for a first (e.g., lowermost) one of charges 160, a third one of charges 160, a fifth one of charges 160, and a seventh (e.g., uppermost) one of charges 160. Table 2 illustrates the orientation of reinforcing fibers 240 of prepreg composite plies 126 used for a second one of charges 160, a fourth one of charges 160, and a sixth one of charges 160. As illustrated, the orientation of reinforcing fibers 240 of prepreg composite plies 126 may alternate between each one of charges 160.

It should be understood that ply counts and orientations in Table 1 and Table 2 are merely exemplary and that other configurations, numbers of prepreg composite plies, and/or other orientations are contemplated. As one example, more or less than twenty-two prepreg composite plies 126 may be used. As one example, the orientations of the reinforcing fibers 240 of prepreg composite plies 126 may vary.

It should also be understood that the number of charges 160 are merely exemplary and that other numbers of charges are also contemplated. As one example, more or less than seven charges 160 may be used to form the part of stiffener 100.

Referring generally to FIGS. 1A and 1B and particularly to, e.g., FIGS. 2-7, 9-11 and 22, stiffener 100 further comprises web 120. A part of second stiffener portion 106 and a part of transition stiffener portion 110 are formed by web 120. Web 120 comprises base 122 and rib 168 perpendicular to base 122. Base 122 of web 120 is parallel to charges 160. The preceding subject matter of this paragraph characterizes example 10 of the present disclosure, wherein example 10 also includes the subject matter according to any one of examples 8 or 9, above.

Base 122 and rib 168 of web 120 enables second stiffener portion 106 and transition stiffener portion 110 to suitably react to bending loads due to compression and provides the majority of the height and a part of the shape of second cross-sectional profile 108 of second stiffener portion 106 and transition cross-sectional profiles 112 of transition stiffener portion.

Base 122 of web 120 is stacked on and is cured (e.g., co-cured) or bonded (e.g., co-bonded or secondarily bonded) to charges 160 forming the part of second stiffener portion 106 and to charges 160 forming the part of transition stiffener portion 110.

A portion of base 122 and rib 168 of web 120 forming the part of second stiffener portion 106 may have a constant cross-sectional dimension along second stiffener portion 106. A portion of base 122 and rib 168 forming the part of transition stiffener portion 110 may have a gradually decreasing cross-sectional dimension along transition stiffener portion 110 from second stiffener portion 106 to first stiffener portion 102.

Web 120 may be formed from a composite material. For example, the composite material may include reinforcing fibers and resins. As one example, web 120 (e.g., base 122 and rib 168) may be a carbon fiber composite. Types of carbon fiber composites used to form web 120 include pre-impregnated ("prepreg") thermoset composite, dry fiber thermoset composite, and thermoplastic composite.

Referring generally to FIGS. 1A and 1B and particularly to, e.g., FIGS. 2-5 and 22, web 120 tapers from second stiffener portion 106 to first stiffener portion 102. The preceding subject matter of this paragraph characterizes example 11 of the present disclosure, wherein example 11 also includes the subject matter according to example 10, above.

Web 120 being tapered from second stiffener portion 106 to first stiffener portion 102 gradually reduces the height of transition cross-sectional profiles 112 from second stiffener portion 106 to first stiffener portion 102 and effectively transfers loads between first stiffener portion 102 and second stiffener portion 106 along transition stiffener portion 110.

Referring generally to FIGS. 1A, 1B and 13-16 and particularly to, e.g., FIGS. 6-11, one of charges 160 has width W1 that gradually decreases along transition stiffener portion 110 from second stiffener portion 106 to first stiffener portion 102. Charges 160 have combined height H1 that gradually increases along transition stiffener portion 110 from second stiffener portion 106 to first stiffener portion 102. The preceding subject matter of this paragraph characterizes example 12 of the present disclosure, wherein example 12 also includes the subject matter according to any one of examples 10 or 11, above.

Gradually decreasing width W1 of each one of charges 160 and gradually increasing combined height H1 of the stack of charges 160 along transition stiffener portion 110 provides for the smooth transition of transition cross-sectional profiles 112 from second cross-sectional profile 108 to first cross-sectional profile 104 and enables effective load transfer between second stiffener portion 106 and first stiffener portion 102 along transition stiffener portion 110.

Width W1 illustrated in FIGS. 6-11 corresponds to the width of a lowermost one of charges 160. It should be understood that the width of each one of charges 160 successively stacked and laminated on the lowermost one of charges 160 also gradually decreases along transition stiffener portion 110 from second stiffener portion 106 to first stiffener portion 102.

For example, a width of a portion of each one of charges 160 forming the part of second stiffener portion 106 is greater than a width of a portion of each one of charges 160 forming first stiffener portion 102 and a width of a portion of each one of charges 160 forming the part of transition stiffener portion 110 gradually decreases from the width of the portion of each one of charges 160 forming the part of second stiffener portion 106 to the width of the portion of each one of charges 160 forming first stiffener portion 102. As one example, and as illustrated in FIG. 12, a width of second base-charge portion 144 of base charge 124 is greater than a width of first base-charge portion 142 of base charge 124. A width of transition base-charge portion 146 of base charge 124 gradually decreases from the width of second base-charge portion 144 to the width of first base-charge portion 142. As illustrated in FIGS. 13-16, each subsequent one of charges 160 (e.g., initial charge 148, subsequent charge A, and subsequent charges B through N) has the same gradual decrease in width.

Referring generally to FIGS. 1A and 1B and particularly to, e.g., FIGS. 6-11, base 122 of web 120 has width W2 that progressively decreases along transition stiffener portion 110 from second stiffener portion 106 to first stiffener portion 102. Rib 168 of web 120 has height H2 that progressively decreases along transition stiffener portion 110 from second stiffener portion 106 to first stiffener portion 102. The preceding subject matter of this paragraph characterizes example 13 of the present disclosure, wherein example 13 also includes the subject matter according to example 12, above.

Progressively (e.g., gradually) decreasing width W2 of base 122 of web 120 and progressively (e.g., gradually) decreasing height H2 of rib 168 of web 120 provides for the smooth transition of transition cross-sectional profiles 112 from second cross-sectional profile 108 to first cross-sectional profile 104 and enables effective load transfer between second stiffener portion 106 and first stiffener portion 102 along transition stiffener portion 110.

Referring generally to FIGS. 1A and 1B and particularly to, e.g., FIGS. 2-5 and 12-14, stiffener 100 further comprises base charge 124, comprising first base-charge portion 142, second base-charge portion 144, and transition base-charge portion 146. A part of first stiffener portion 102 is formed by first base-charge portion 142. A part of second stiffener portion 106 is formed by second base-charge portion 144. A part of transition stiffener portion 110 is formed by transition base-charge portion 146. Transition base-charge portion 146 of base charge 124 tapers from second base-charge portion 144 to first base-charge portion 142. Stiffener 100 also comprises initial charge 148 laminated onto base charge 124. Initial charge 148 comprises first initial-charge portion 150 and transition initial-charge portion 152. A part of first stiffener portion 102 is formed by first initial-charge portion 150. A part of transition stiffener portion 110 is formed by transition initial-charge portion 152. First initial-charge portion 150 of initial charge 148 is shaped identically to first base-charge portion 142 of base charge 124, and transition initial-charge portion 152 of initial charge 148 is shaped identically to at least a portion of transition base-charge portion 146 of base charge 124. Stiffener 100 further comprises subsequent charge A laminated onto initial charge 148. Subsequent charge A comprises first subsequent-charge-A portion and transition subsequent-charge-A portion. A part of first stiffener portion 102 is formed by first subsequent-charge-A portion. A part of transition stiffener portion 110 is formed by transition subsequent-charge-A portion. First subsequent-charge-A portion of subsequent charge A is shaped identically to first initial-charge portion 150 of initial charge 148. Transition subsequent-charge-A portion of subsequent charge A is smaller than transition initial-charge portion 152 of initial charge 148 and is shaped identically to a portion of transition initial-charge portion 152. The preceding subject matter of this paragraph characterizes example 14 of the present disclosure, wherein example 14 also includes the subject matter according to any one of examples 1-13, above.

A laminated stack of base charge 124, initial charge 148 and subsequent charge A form an integral, continuous part of stiffener 100 capable of effectively reacting to loads (e.g., different bending loads) and transferring loads between first stiffener portion 102 and second stiffener portion 106 along transition stiffener portion 110.

Base charge 124, initial charge 148 and subsequent charge A being sequentially stacked and laminated define combined height H1 (FIGS. 8-11) of charges 160, partially defines first cross-sectional profile 104 of first stiffener portion 102 and transition cross-sectional profiles 112 of transition stiffener portion 110, and enhance the load-carrying capabilities of stiffener 100.

In the examples illustrated in FIGS. 12-22 dashed lines delineate first stiffener portion 102, transition stiffener portion 110 and second stiffener portion 106. As such, the dashed lines delineate first base-charge portion 142, transition base-charge portion 146, and second base-charge portion 144 of base charge 124, as illustrated in FIG. 12. Similarly, the dashed lines delineate first initial-charge portion 150 and transition initial-charge portion 152 of initial charge 148, as illustrated in FIG. 13. Similarly, the dashed lines delineate first subsequent-charge-A portion and transition subsequent-charge-A portion of subsequent charge A, as illustrated in FIG. 14.

Transition base-charge portion 146 of base charge 124 tapering from second base-charge portion 144 to first base-charge portion 146, transition initial-charge portion 152 of initial charge 148 tapering to first initial-charge portion 150, transition subsequent-charge-A portion of subsequent charge A tapering to first subsequent-charge-A portion gradually reduces the width of the part of stiffener 100 (e.g., the width of the laminated stack of charges 160) from second stiffener portion 106 to first stiffener portion 102 along transition stiffener portion 110 and provides for the smooth transition from second stiffener portion 106 to first stiffener portion 102 along transition stiffener portion 110.

Transition initial-charge portion 152 of initial charge 148 being smaller than transition base-charge portion 146 of base charge 124 and transition subsequent-charge-A portion of subsequent charge A being smaller than transition initial-charge portion 152 of initial charge 148 gradually reduces the width of the part of stiffener 100 (e.g., the width of the laminated stack of charges 160) from base charge 124 to subsequent charge A.

Transition initial-charge portion 152 of initial charge 148 being shaped identically to at least a portion of transition base-charge portion 146 of base charge 124 and first subsequent-charge-A portion of subsequent charge A being shaped identically to first initial-charge portion 150 of initial charge 148 and transition subsequent-charge-A portion of subsequent charge A being smaller than transition initial-charge portion 152 of initial charge 148 and being shaped identically to a portion of transition initial-charge portion 152 gradually increases the combined height of the part of stiffener 100 (e.g., the combined height of the laminated stack of charges 160) from second stiffener portion 106 to first stiffener portion 102 along transition stiffener portion 110.

As one example, and as best illustrated in FIG. 12, second base-charge portion 144 of base charge 124 has a generally rectangular two-dimensional ("2D") shape. As used herein, the term 2D shape refers to a two-dimensional shape in an orthogonal view. First base-charge portion 142 of base charge 124 has a generally rectangular 2D shape. A maximum width of first base-charge portion 142 is smaller than a maximum width of second base-charge portion 144. Transition base-charge portion 146 of base charge 124 has a trapezoidal 2D shape. A maximum width of transition base-charge portion 146 gradually decreases from the maximum width of first base-charge portion 142 to the maximum width of second base-charge portion 144.

As illustrated in FIG. 13, first initial-charge portion 150 of initial charge 148 has a generally rectangular 2D shape. A maximum width of first initial-charge portion 150 is smaller than the maximum width of first base-charge portion 142. Transition initial-charge portion 152 has a generally trapezoidal 2D shape. A maximum width of transition initial-charge portion 152 is smaller than the maximum width of transition base-charge portion 146. A maximum length of transition initial-charge portion 152 may be larger than, equal to, or smaller than a maximum length of transition base-charge portion 146. As one example, and as illustrated in FIG. 13, the length of transition initial-charge portion 152 is larger than the length of transition base-charge portion 146 such that a small portion having a rectangular 2D shape extends over second base-charge portion 144.

As illustrated in FIG. 14, first subsequent-charge-A portion of subsequent charge A has a generally rectangular 2D shape. A maximum width of first subsequent-charge-A portion is smaller than the maximum width of first initial-charge portion 150. Transition subsequent-charge-A portion has a generally trapezoidal 2D shape. A maximum width of transition subsequent-charge-A portion is smaller than the width of transition initial-charge portion 152. A maximum length of transition subsequent-charge-A portion is less than the maximum length of transition initial-charge portion 152.

As described above, base charge 124, initial charge 148, and subsequent charge A each have a trapezoidal cross-sectional shape. The stack of transition base-charge portion 146 of base charge 124, transition initial-charge portion 152 of initial charge 148, and transition subsequent-charge-A portion of subsequent charge A has a trapezoidal cross-sectional shape. The stack of first base-charge portion 142 of base charge 124, first initial-charge portion 150 of initial charge 148, and first subsequent-charge-A portion of subsequent charge A has a trapezoidal cross-sectional shape.

Referring generally to FIGS. 1A and 1B and particularly to, e.g., FIGS. 2-5 and 22, stiffener 100 further comprises web 120. A part of second stiffener portion 106 and a part of transition stiffener portion 110 are formed by web 120. The preceding subject matter of this paragraph characterizes example 15 of the present disclosure, wherein example 15 also includes the subject matter according to example 14, above.

Web 120 enables second stiffener portion 106 and transition stiffener portion 110 to suitably react to bending loads primarily due to compression and provides the majority of the height of second cross-sectional profile 108 of second stiffener portion 106 and transition cross-sectional profiles 112 of transition stiffener portion.

As one example, web 120 is stacked on and is cured (e.g., co-cured) or bonded (e.g., co-bonded or secondarily bonded) to second base-charge portion 144 of base charge 124 and, optionally, a portion of transition initial-charge portion 150 of initial charge 148 to form the part of second stiffener portion 106 and to a portion of transition initial-charge portion 150 of initial charge 148 and transition subsequent-charge-A portion of subsequent charge A to form the part of transition stiffener portion 110.

Referring generally to FIGS. 1A and 1B and particularly to, e.g., FIGS. 18-21, stiffener 100 further comprises cover layer 176 between web 120 and subsequent charge A, initial charge 148, and base charge 124. Cover layer 176 covers first stiffener portion 102, formed, at least partially, by first base-charge portion 142 of base charge 124, first initial-charge portion 150 of initial charge 148, and first subsequent-charge-A portion of subsequent charge A. Cover layer 176 also covers a part of transition stiffener portion 110, formed, at least partially, by transition base-charge portion 146 of base charge 124, transition initial-charge portion 152 of initial charge 148, and transition subsequent-charge-A portion of subsequent charge A. Additionally, cover layer 176 covers a part of second stiffener portion 106, formed, at least partially, by second base-charge portion 144 of base charge 124. The preceding subject matter of this paragraph characterizes example 16 of the present disclosure, wherein example 16 also includes the subject matter according to example 15, above.

Covering (e.g., wrapping) base charge 124, initial charge 148 and subsequent charge A with cover layer 176 further integrates base charge 124, initial charge 148 and subsequent charge A (e.g., charges 160) into a continuous part of stiffener 100 capable of reacting to bending loads and transferring loads between first stiffener portion 102 and second stiffener portion 106.

Cover layer 176 may be formed from a composite material. For example, the composite material may include reinforcing fibers and resins. As one example, cover layer 176 may be a carbon fiber composite. Cover layer 176 may be flush against exterior surfaces of base charge 124, initial charge 148 and subsequent charge A. Cover layer 176 may be cured (e.g., co-cured) or bonded (e.g., co-bonded) with base charge 124, initial charge 148, subsequent charge A and web 120.

As one example, cover layer 176 may be one ply of carbon fiber-reinforced polymer fabric mesh with fibers oriented in a zero (0) degree direction and a ninety (90) degree direction and woven together to form a continuous ply.

Referring generally to FIGS. 1A and 1B and particularly to, e.g., FIGS. 2-5 and 20-22, web 120 comprises web charge 178, comprising second web-charge portion 180 and transition web-charge portion 182. A part of second stiffener portion 106 is formed by second web-charge portion 180. A part of transition stiffener portion 110 is formed by transition web-charge portion 182. Web 120 also comprises opposing web charge 184, abutting a portion of web charge 178 and comprising second opposing-web-charge portion 186 and transition opposing-web-charge portion 188. A part of second stiffener portion 106 is formed by second opposing-web-charge portion 186. A part of transition stiffener portion 110 is formed by transition opposing-web-charge portion 188. The preceding subject matter of this paragraph characterizes example 17 of the present disclosure, wherein example 17 also includes the subject matter according to any one of examples 15 or 16, above.

Web charge 178 and opposing web charge 184 in combination enable second stiffener portion 106 and transition stiffener portion 110 to suitably react to bending loads primarily due to compression and provides the majority of the height and a part of the shape of second cross-sectional profile 108 of second stiffener portion 106 and transition cross-sectional profiles 112 of transition stiffener portion.

Second web-charge portion 180 of web charge 178 and second opposing-web-charge portion 186 of opposing web charge 184 may be positioned (e.g., stacked) on second base-charge portion 144 of base charge 124. Cross-sectional dimensions of second web-charge portion 180 of web charge 178 and second opposing-web-charge portion 186 of opposing web charge 184 may be constant along second base-charge portion 144 of base charge 124, for example, to form the part of second stiffener portion 106.

Transition web-charge portion 182 of web charge 178 and transition opposing-web-charge portion 188 of opposing web charge 184 may be positioned (e.g., stacked) on transition initial-charge portion 152 of initial charge 148 and transition subsequent-charge-A portion of subsequent charge A. Cross-section dimensions of transition web-charge portion 182 of web charge 178 and transition opposing-web-charge portion 188 of opposing web charge 184 may gradually decrease along transition initial-charge portion 152 of initial charge 148 and transition subsequent-charge-A portion of subsequent charge A, for example, to form the part of transition stiffener portion 110. The gradual reduction in the cross-sectional dimensions of transition web-charge portion 182 of web charge 178 and transition opposing-web-charge portion 188 of opposing web charge 184 may taper web 120 along transition stiffener portion 110.

Web charge 178 and opposing web charge 184 may be formed from a composite material. For example, the composite material may include reinforcing fibers and resins. As one example, web charge 178 and opposing web charge 184 may be a carbon fiber composite. Web charge 178 and opposing web charge 184 of web 120 may be cured (e.g., co-cured) together. Web charge 178 and opposing web charge 184 of web 120 may be cured (e.g., co-cured) or bonded (e.g., co-bonded or secondarily bonded) to charges 160 (e.g., second base-charge portion 144 of base charge 124) to form the part of second stiffener portion 106 and to charges 160 (e.g., transition initial-charge portion 152 of initial charge 148 and transition subsequent-charge-A portion of subsequent charge A) to form the part of transition stiffener portion 110.

Referring generally to FIGS. 1A, 1B and 2-5 and particularly to, e.g., FIGS. 9-11, thicknesses T of transition web-charge portion 182 of web charge 178 and of transition opposing-web-charge portion 188 of opposing web charge 184 progressively decrease from second stiffener portion 106 to first stiffener portion 102. The preceding subject matter of this paragraph characterizes example 18 of the present disclosure, wherein example 18 also includes the subject matter according to example 17, above.

Thickness T of transition web-charge portion 182 of web charge 178 and of transition opposing-web-charge portion 188 of opposing web charge 184 gradually decreasing from second stiffener portion 106 to first stiffener portion 102 gradually reduces transition cross-sectional profiles 112 from second stiffener portion 106 to first stiffener portion 102.

The gradual reduction in thickness T of transition web-charge portion 182 of web charge 178 and of transition opposing-web-charge portion 188 of opposing web charge 184 may be created during the formation process (e.g., lay-up process) web charge 178 and opposing web charge 184.

Referring generally to FIGS. 1A and 1B and particularly to, e.g., FIGS. 2-5, 9-11, 21 and 22, transition web-charge portion 182 of web charge 178 and transition opposing-web-charge portion 188 of opposing web charge 184 taper from second stiffener portion 106 to first stiffener portion 102. The preceding subject matter of this paragraph characterizes example 19 of the present disclosure, wherein example 19 also includes the subject matter according to any one of examples 17 or 18, above.

Transition web-charge portion 182 of web charge 178 and transition opposing-web-charge portion 188 of opposing web charge 184 being tapered from second stiffener portion 106 to first stiffener portion 102 smoothly blends transition cross-sectional profiles 112 from second stiffener portion 106 to first stiffener portion 102.

The tapering of transition web-charge portion 182 of web charge 178 and transition opposing-web-charge portion 188 of opposing web charge 184 gradually reduces web 120 along transition stiffener portion 110 to a point where web 120 (e.g., web charge 182 and opposing web charge 184) is effectively eliminated proximate (e.g., at or near) a transition between transition stiffener portion 110 and first stiffener portion 102.

Referring generally to FIGS. 1A and 1B and particularly to, e.g., FIGS. 2-6, 9, 10 and 20-22, each of web charge 178 and opposing web charge 184 is L-shaped. The preceding subject matter of this paragraph characterizes example 20 of the present disclosure, wherein example 20 also includes the subject matter according to any one of examples 17-19, above.

L-shaped web charge 178 and opposing web charge 184 are used to form a part of T-shaped second cross-sectional profile 108 of second stiffener portion 106.

As used herein, the term "L-shaped" refers to a shaped member having a first (e.g., substantially vertical) portion and a second (e.g., substantially horizontal) portion substantially perpendicularly coupled to a first end of the first portion. The second portion extends laterally outward in one direction from the first end of the first portion.

Referring generally to FIGS. 1A and 1B and particularly to, e.g., FIG. 7, each of web charge 178 and opposing web charge 184 is U-shaped. The preceding subject matter of this paragraph characterizes example 21 of the present disclosure, wherein example 21 also includes the subject matter according to any one of examples 17-19, above.

A U-shaped web charge 178 and opposing web charge 184 are used to form a part of the I-shaped second cross-sectional profile 108 of second stiffener portion 106.

As used herein, the term "U-shaped" refers to a shaped member having a first (e.g., substantially vertical) portion, a second (e.g., substantially horizontal) portion perpendicularly coupled to a first end of the first portion, and a third (e.g., substantially horizontal) portion substantially perpendicularly coupled to a second end (opposite the first end) of the first portion. The second portion extends laterally outward in one direction from the first end of the first portion. The third portion extends laterally outward in the same one direction from the second end of the first portion.

Referring generally to FIGS. 1A and 1B and particularly to, e.g., FIG. 7, stiffener 100 further comprises cap charge 190, laminated onto portions of web charge 178 and opposing web charge 184. Cap charge 190 forms a part of second stiffener portion 106 and a part of transition stiffener portion 110. The preceding subject matter of this paragraph characterizes example 22 of the present disclosure, wherein example 22 also includes the subject matter according to example 21, above.

Cap charge 190 intercouples web charge 178 and opposing web charge 184 and forms a part of the I-shaped second cross-sectional profile 108 of second stiffener portion 106. Cap charge 190 further enables second stiffener portion 106 and transition stiffener portion 110 to suitably react to bending loads primarily due to compression loading.

As one example, cap charge 190 is stacked on and laminated to the third portions of the U-shaped web charge 178 and opposing web charge 184.

Cap charge 190 may be formed from a composite material. For example, the composite material may include reinforcing fibers and resins. As one example, cap charge 190 may be a carbon fiber composite. Cap charge 190 may be cured (e.g., co-cured) or bonded (e.g., co-bonded or secondarily bonded) to web 120 (e.g., web charge 178 and opposing web charge 184) to form the part of second stiffener portion 106 and the part of transition stiffener portion 110.

Referring generally to FIGS. 1A and 1B and particularly to, e.g., FIGS. 2-7, 9, 10 and 19-22, stiffener 100 further comprises filler charge 192 between web charge 178 and opposing web charge 184. Filler charge 192 comprises second filler-charge portion 194 and transition filler-charge portion 196. A part of second stiffener portion 106 is formed by second filler-charge portion 194. A part of transition stiffener portion 110 is formed by transition filler-charge portion 196. The preceding subject matter of this paragraph characterizes example 23 of the present disclosure, wherein example 23 also includes the subject matter according to any one of examples 17-22, above.

Filler charge 192 enhances the load-carrying capabilities of stiffener 100.

Filler charge 192 fills an open space between web charge 178 and opposing web charge 184. As one example, the open space between web charge 178 and opposing web charge 184 is formed by the radius or angular transition between the first portions and the second portions of the L-shaped or U-shaped web charge 178 and opposing web charge 184. Filler charge 192 may be formed or cut as required to fill the open space (e.g., the radius) between web charge 178 and opposing web charge 184.

A cross-sectional dimension of second filler-charge portion 194 of filler charge 192 may be along second base-charge portion 144 of base charge 124, for example, to form the part of second stiffener portion 106. A cross-sectional dimension of transition filler-charge portion 196 of filler charge 194 may gradually decrease along transition initial-charge portion 152 of initial charge 148 and transition subsequent-charge-A portion of subsequent charge A, for example, to form the part of transition stiffener portion 110.

Filler charge 192 may be formed from a composite material. For example, the composite material may include reinforcing fibers or a woven fabric and resins. As one example, filler charge 192 may be a carbon fiber composite. Filler charge 192 may be cured (e.g., co-cured) or bonded (e.g., co-bonded or secondarily bonded) to web 120 (e.g., web charge 178 and opposing web charge 184), second base-charge portion 144 of base charge 124, and transition initial-charge portion 152 of initial charge 148 and transition subsequent-charge-A portion of subsequent charge A.

Referring to FIG. 7, as one example, stiffener 100 also includes another filler charge 193 between web charge 178, opposing web charge 184, and cap charge 190. Filler charge 193 may be substantially the same as filler charge 192. Filler charge 193 fills an open space between web charge 178 and opposing web charge 184. As one example, the open space between web charge 178 and opposing web charge 184 is formed by the radius or angular transition between the second portions and the third portions of the U-shaped web charge 178 and opposing web charge 184. Filler charge 192 may be formed or cut as required to fill the open space (e.g., the radius) between web charge 178 and opposing web charge 184.

When used in the construction of wing 206 of aircraft 208 (e.g., FIG. 24), filler charge 192 of stiffener 100 may also be known as a radius filler or noodle.

Referring generally to FIGS. 1A and 1B and particularly to, e.g., FIG. 15, stiffener 100 further comprises subsequent charge B, laminated onto subsequent charge A. Subsequent charge B comprises first subsequent-charge-B portion, forming a part of first stiffener portion 102, and transition subsequent-charge-B portion, forming a part of transition stiffener portion 110. First subsequent-charge-B portion of subsequent charge B is shaped identically to first subsequent-charge-A portion of subsequent charge A. Transition subsequent-charge-B portion of subsequent charge B is smaller than transition subsequent-charge-A portion of subsequent charge A and is shaped identically to a portion of transition subsequent-charge-A portion. The preceding subject matter of this paragraph characterizes example 24 of the present disclosure, wherein example 24 also includes the subject matter according to any one of examples 14-23, above.

Subsequent charge B being stacked and laminated onto subsequent charge A further increases combined height H1 (FIGS. 8-11) of charges 160, further partially defines first cross-sectional profile 104 of first stiffener portion 102 and transition cross-sectional profiles 112 of transition stiffener portion 110, and enhances the load-carrying capabilities of stiffener 100.

As illustrated in FIG. 15, first subsequent-charge-B portion of subsequent charge B has a generally rectangular 2D shape. A maximum width of first subsequent-charge-B portion is smaller than the maximum width of first subsequent-charge-A portion. Transition subsequent-charge-B portion has a generally trapezoidal 2D shape. A maximum width of transition subsequent-charge-B portion is smaller than the maximum width of transition subsequent-charge-A portion. A maximum length of transition subsequent-charge-B portion is less than the maximum length of transition subsequent-charge-A portion.

As illustrated in FIGS. 18-21, when additional charges 160 (e.g., subsequent charge B) are used to form the part of first stiffener portion 102 and the part of transition stiffener portion 110, cover layer 176 also covers subsequent charge B, web 120 is also stacked and laminated onto transition subsequent-charge-B portion of subsequent charge B, and filler charge 192 is positioned on transition subsequent-charge-B portion between web charge 178 and opposing web charge 184.

As described above, transition subsequent-charge-B has a trapezoidal cross-sectional shape. The stack of transition base-charge portion 146 of base charge 124, transition initial-charge portion 152 of initial charge 148, transition subsequent-charge-A portion of subsequent charge A, and transition subsequent-charge-B portion of subsequent charge B has a trapezoidal cross-sectional shape. The stack of first base-charge portion 142 of base charge 124, first initial-charge portion 150 of initial charge 148, first subsequent-charge-A portion of subsequent charge A, and first subsequent-charge-B portion of subsequent charge B has a trapezoidal cross-sectional shape.

Referring generally to FIGS. 1A and 1B and particularly to, e.g., FIGS. 16 and 17, stiffener 100 further comprises subsequent charges B through N, sequentially laminated onto subsequent charge A. Subsequent charges B through N respectively comprise first subsequent-charge-B-through-N portions, forming a part of first stiffener portion 102, and transition subsequent-charge-B-through-N portions, forming a part of transition stiffener portion 110. First subsequent-charge-B-through-N portions of subsequent charges B through N are shaped identically to first subsequent-charge-A portion of subsequent charge A. Transition subsequent-charge-B-through-N portions of subsequent charges B through N are smaller than transition subsequent-charge-A portion of subsequent charge A. Each one of transition subsequent-charge-B-through-N portions of subsequent charges B through N is smaller than a preceding one of transition subsequent-charge-B-through-N portions of subsequent charges B through N. Each one of transition subsequent-charge-B-through-N portions of subsequent charges B through N is shaped identically to a portion of transition subsequent-charge-A portion. The preceding subject matter of this paragraph characterizes example 25 of the present disclosure, wherein example 25 also includes the subject matter according to any one of examples 14-23, above.

Subsequent charges B through N being sequentially stacked and laminated onto subsequent charge A further increases combined height H1 (FIGS. 8-11) of charges 160, further partially defines first cross-sectional profile 104 of first stiffener portion 102 and transition cross-sectional profiles 112 of transition stiffener portion 110, and enhances the load-carrying capabilities of stiffener 100.

As illustrated in FIG. 16, each one of first subsequent-charge-B-through-N portions of subsequent charges B through N has a generally rectangular 2D shape. A maximum width of each one of first subsequent-charge-B-through-N portions is smaller than the maximum width of first subsequent-charge-A portion and a maximum width of a preceding one of first subsequent-charge-B-through-N portions. Each one of transition subsequent-charge-B-through-N portions of subsequent charges B through N has a generally trapezoidal 2D shape. A maximum width of each one of transition subsequent-charge-B-through-N portions is smaller than the maximum width of transition subsequent-charge-A and a maximum width of a preceding one of first subsequent-charge-B-through-N portions. A maximum length of each one of transition subsequent-charge-B-through-N portions is less than the maximum length of transition subsequent-charge-A portion and a maximum length of a preceding one of first subsequent-charge-B-through-N portions.

As illustrated in FIGS. 18-21, when additional charges 160 (e.g., subsequent charges B through N) are used to form the part of first stiffener portion 102 and the part of transition stiffener portion 110, cover layer 176 also covers subsequent charges B through N, web 120 is also stacked and laminated onto transition subsequent-charge-B-through-N portions of subsequent charges B through N, and filler charge 192 is positioned on transition subsequent-charge-B-through-N portions between web charge 178 and opposing web charge 184.

As described above, each one of transition subsequent-charge-B-through-N portions of subsequent charges B through N has a trapezoidal cross-sectional shape. The stack of transition base-charge portion 146 of base charge 124, transition initial-charge portion 152 of initial charge 148, transition subsequent-charge-A portion of subsequent charge A, and transition subsequent-charge-B-through-N portions of subsequent charges B through N has a trapezoidal cross-sectional shape. The stack of first base-charge portion 142 of base charge 124, first initial-charge portion 150 of initial charge 148, first subsequent-charge-A portion of subsequent charge A, and first subsequent-charge-B-through-N portions of subsequent charges B through N has a trapezoidal cross-sectional shape.

Referring generally to FIGS. 1A and 1B and particularly to, e.g., FIGS. 2-11 and 22, structure 200 is disclosed. Structure 200 comprises skin 202, comprising surface 204, and stiffener 100, coupled to surface 204 of skin 202. Stiffener 100 comprises first stiffener portion 102, having first cross-sectional profile 104 that is constant along first stiffener portion 102. Stiffener 100 also comprises second stiffener portion 106, having second cross-sectional profile 108 that is constant along second stiffener portion 106. Second cross-sectional profile 108 of second stiffener portion 106 is different from first cross-sectional profile 104 of first stiffener portion 102. Stiffener 100 further comprises transition stiffener portion 110, tapering from second stiffener portion 106 to first stiffener portion 102. The preceding subject matter of this paragraph characterizes example 26 of the present disclosure.

Structure 200 having skin 202 stiffened by stiffener 100 provides different structural characteristics, for example, size, shape and/or load bearing characteristics along a length of stiffener 100.

First stiffener portion 102 and second stiffener portion 106 enable a single continuous stiffener 100 having different cross-sectional profiles and/or dimensions to stiffen structure 200, which provide different structural characteristics, for example, size, shape and/or load bearing characteristics.

Transition stiffener portion 110 effectively transfers a load between first stiffer portion 102 and second stiffener portion 106. Gradually shifting (e.g., tapering) from first cross-sectional profile 104 of first stiffener portion 102 to second cross-sectional profile 108 of second stiffener portion 106 along transition stiffener portion 110 provides a more effective load transfer as compared to abutting, splicing or otherwise coupling two different stiffeners each having a different cross-sectional profile.

Referring generally to FIGS. 1A and 1B and particularly to, e.g., FIGS. 4, 5, and 8, first cross-sectional profile 104 of first stiffener portion 102 is trapezoidally shaped. The preceding subject matter of this paragraph characterizes example 27 of the present disclosure, wherein example 27 also includes the subject matter according to example 26, above.

A trapezoidally shaped first cross-sectional profile 104 of first stiffener portion 102 of stiffener 100 enables first stiffener portion 102 and, thus, structure 200 to suitably react to bending loads primarily due to tension loading, while also providing a relatively short profile height.

Referring generally to FIGS. 1A and 1B and particularly to, e.g., FIGS. 4-6, second cross-sectional profile 108 of second stiffener portion 106 is T-shaped. The preceding subject matter of this paragraph characterizes example 28 of the present disclosure, wherein example 28 also includes the subject matter according to any one of examples 26 or 27, above.

A T-shaped second-cross sectional profile 108 of second stiffener portion 106 of stiffener 100 enables second stiffener portion 106, and, thus, structure 200 to suitably react to bending loads primarily due to compression loading, while also providing a relatively tall profile height.

Referring generally to FIGS. 1A and 1B and particularly to, e.g., FIG. 7, second cross-sectional profile 108 of second stiffener portion 106 is I-shaped. The preceding subject matter of this paragraph characterizes example 29 of the present disclosure, wherein example 29 also includes the subject matter according to any one of examples 26 or 27, above.

I-shaped second cross-sectional profile 108 of second stiffener portion 106 of stiffener 100 enables second stiffener portion 106 and, thus, structure 200 to suitably react to bending loads primarily due to compression loading, while also providing a relatively tall profile height.

Referring generally to FIGS. 1A and 1B and particularly to, e.g., FIGS. 2-5 and 9-11, transition stiffener portion 110 comprises transition cross-sectional profiles 112. Transitional cross-sectional profiles 112 of transition stiffener portion 110 are different from first cross-sectional profile 104 of first stiffener portion 102 and second cross-sectional profile 108 of second stiffener portion 106. The preceding subject matter of this paragraph characterizes example 30 of the present disclosure, wherein example 30 also includes the subject matter according to any one of examples 26-29, above.

Transition cross-sectional profiles 112 of transition stiffener portion 110 gradually shifting (e.g., transitioning) from first cross-sectional profile 104 of first stiffener portion 102 to second cross-sectional profile 108 of second stiffener portion 106 to provides effective load transfer between first stiffener portion 102 and second stiffener portion 106 through transition stiffener portion 110 and along skin 202 of structure 200.

Referring generally to FIGS. 1A and 1B and particularly to, e.g., FIGS. 2-5 and 9-11, all of transitional cross-sectional profiles 112 of transition stiffener portion 110 are different. The preceding subject matter of this paragraph characterizes example 31 of the present disclosure, wherein example 31 also includes the subject matter according to example 30, above.

All of transition cross-sectional profiles 112 of transition stiffener portion 110 being different provide a consistent and continual transition (e.g., ramp rate) between first cross-sectional profile 104 of first stiffener portion 102 and second cross-sectional profile 108 of second stiffener portion 106 (e.g., from second cross-sectional profile 108 of second stiffener portion 106 to first cross-sectional profile 104 of first stiffener portion 102 or from first cross-sectional profile 104 of first stiffener portion 102 to second cross-sectional profile 108 of second stiffener portion 106).

Referring generally to FIGS. 1A and 1B and particularly to, e.g., FIGS. 2-5 and 9-11, transition cross-sectional profiles 112 smoothly transition from second cross-sectional profile 108 of second stiffener portion 106 to first cross-sectional profile 104 of first stiffener portion 102. The preceding subject matter of this paragraph characterizes example 32 of the present disclosure, wherein example 32 also includes the subject matter according to example 31, above.

A smooth transition between first cross-sectional profile 104 and second cross-sectional profile 108 along transition cross-sectional profiles 112 gradually changes the centroid of stiffener 100 and reduces the potential of stiffener 100 pulling off of surface 204 of skin 202.

Abrupt changes to the centroid of stiffener 100 may increase the potential of stiffener 100 pulling away from surface 204 of skin 202.

Referring generally to FIGS. 1A and 1B and particularly to, e.g., FIGS. 6-11 and 13-22, stiffener 100 further comprises charges 160 laminated together to form first stiffener portion 102, a part of second stiffener portion 106, and a part of transition stiffener portion 110. The preceding subject matter of this paragraph characterizes example 33 of the present disclosure, wherein example 33 also includes the subject matter according to any one of examples 26-32, above.

Charges 160 that are stacked and laminated together form an integral, continuous part of stiffener 100 capable of effectively transferring loads between first stiffener portion 102 and second stiffener portion 106 along transition stiffener portion 110.

Referring, e.g., to FIGS. 1A and 1B, stiffener 100 further comprises prepreg composite plies 126 laminated together to form each one of charges 160. Prepreg composite plies 126 comprise reinforcement fibers 240. Reinforcement fibers 240 of approximately fifty percent of prepreg composite plies 126 are parallel to a primary load direction of stiffener 100. Reinforcement fibers 240 of approximately forty percent of prepreg composite plies 126 are at forty-five degrees to primary load direction of stiffener 100. Reinforcement fibers 240 of approximately ten percent of prepreg composite plies 126 are perpendicular to primary load direction of stiffener 100. The preceding subject matter of this paragraph characterizes example 34 of the present disclosure, wherein example 34 also includes the subject matter according to example 33, above.

Varying and/or alternating the orientation of reinforcing fibers 240 among prepreg composite plies 126, with respect to a longitudinal axis of each one of charges 160, at a plurality of different angles, such as approximate angles of 0-degrees, −45-degrees, 90-degrees, and 45-degrees, produces optimum mechanical properties (e.g., strength and/or stiffness) in charges 160 and stiffener 100 formed from charges 160.

Referring generally to FIGS. 1A and 1B and particularly to, e.g., FIGS. 2-7, 9-11 and 22, stiffener 100 further comprises web 120, forming a part of second stiffener portion 106 and a part of transition stiffener portion 110. Web 120 comprises base 122 and rib 168, perpendicular to base 122. Base 122 of web 120 is parallel to charges 160. The preceding subject matter of this paragraph characterizes example 35 of the present disclosure, wherein example 35 also includes the subject matter according to any one of examples 33 or 34, above.

Base 122 and rib 168 of web 120 enables second stiffener portion 106 and transition stiffener portion 110 to suitably react to bending loads due to compression and provides the majority of the height and a part of the shape of second cross-sectional profile 108 of second stiffener portion 106 and transition cross-sectional profiles 112 of transition stiffener portion.

Referring generally to FIGS. 1A and 1B and particularly to, e.g., FIGS. 2-5 and 22, web 120 of stiffener 100 tapers from second stiffener portion 106 to first stiffener portion 102. The preceding subject matter of this paragraph characterizes example 36 of the present disclosure, wherein example 36 also includes the subject matter according to example 35, above.

Web 120 being tapered from second stiffener portion 106 to first stiffener portion 102 gradually reduces the height of transition cross-sectional profiles 112 from second stiffener portion 106 to first stiffener portion 102 and effectively transfers loads between first stiffener portion 102 and second stiffener portion 106 along transition stiffener portion 110.

Referring generally to FIGS. 1A and 1B and particularly to, e.g., FIGS. 6-11, one of charges 160 has width W1 that gradually decreases along transition stiffener portion 110 from second stiffener portion 106 to first stiffener portion 102. Charges 160 have combined height H1 that gradually increases along transition stiffener portion 110 from second stiffener portion 106 to first stiffener portion 102. The preceding subject matter of this paragraph characterizes example 37 of the present disclosure, wherein example 37 also includes the subject matter according to any one of examples 35 or 36, above.

Gradually decreasing width W1 of each one of charges 160 and gradually increasing combined height H1 of the stack of charges 160 along transition stiffener portion 110 provides for the smooth transition of transition cross-sectional profiles 112 from second cross-sectional profile 108 to first cross-sectional profile 104 and enables effective load transfer between second stiffener portion 106 and first stiffener portion 102 along transition stiffener portion 110.

Referring generally to FIGS. 1A and 1B and particularly to, e.g., FIGS. 6-11, base 122 of web 120 has width W2 that progressively decreases along transition stiffener portion 110 from second stiffener portion 106 to first stiffener portion 102. Rib 168 of web 120 has height H2 that progressively decreases along transition stiffener portion 110 from second stiffener portion 106 to first stiffener portion 102. The preceding subject matter of this paragraph characterizes example 38 of the present disclosure, wherein example 38 also includes the subject matter according to example 37, above.

Progressively (e.g., gradually) decreasing width W2 of base 122 of web 120 and progressively (e.g., gradually) decreasing height H2 of rib 168 of web 120 provides for the smooth transition of transition cross-sectional profiles 112 from second cross-sectional profile 108 to first cross-sectional profile 104 and enables effective load transfer between second stiffener portion 106 and first stiffener portion 102 along transition stiffener portion 110.

Referring generally to FIGS. 1A and 1B and particularly to, e.g., FIGS. 2-5 and 12-14, stiffener 100 further comprises base charge 124, comprising first base-charge portion 142, forming a part of first stiffener portion 102, second base-charge portion 144, forming a part of second stiffener portion 106, and transition base-charge portion 146, forming a part of transition stiffener portion 110. Transition base-charge portion 146 of base charge 124 tapers from second base-charge portion 144 to first base-charge portion 142. Stiffener also comprises initial charge 148, laminated onto base charge 124. Initial charge 148 comprises first initial-charge portion 150, forming a part of first stiffener portion 102, and transition initial-charge portion 152, forming a part of transition stiffener portion 110. First initial-charge portion 150 of initial charge 148 is shaped identically to first base-charge portion 142 of base charge 124, and transition initial-charge portion 152 of initial charge 148 is shaped identically to at least a portion of transition base-charge portion 146 of base charge 124. Stiffener 100 further comprises subsequent charge A, laminated onto initial charge 148. Subsequent charge A comprises first subsequent-charge-A portion, forming a part of first stiffener portion 102, and transition subsequent-charge-A portion, forming a part of transition stiffener portion 110. First subsequent-charge-A portion of subsequent charge A is shaped identically to first initial-charge portion 150 of initial charge 148, and transition subsequent-charge-A portion of subsequent charge A is smaller than transition initial-charge portion 152 of initial charge 148 and is shaped identically to a portion of transition initial-charge portion 152. The preceding subject matter of this paragraph characterizes example 39 of the present disclosure, wherein example 39 also includes the subject matter according to any one of examples 26-38, above.

A laminated stack of base charge 124, initial charge 148, and subsequent charge A form an integral, continuous part of stiffener 100 capable of effectively reacting to loads (e.g., different bending loads) and transferring loads between first stiffener portion 102 and second stiffener portion 106 along transition stiffener portion 110 and along skin 202.

Referring generally to FIGS. 1A and 1B and particularly to, e.g., FIGS. 2-5 and 22, stiffener 100 further comprises web 120, forming a part of second stiffener portion 106 and a part of transition stiffener portion 110. The preceding subject matter of this paragraph characterizes example 40 of the present disclosure, wherein example 40 also includes the subject matter according to example 39, above.

Web 120 enables second stiffener portion 106 and transition stiffener portion 110 and, thus, skin 202 to suitably react to bending loads primarily due to compression and provides the majority of the height of second cross-sectional profile 108 of second stiffener portion 106 and transition cross-sectional profiles 112 of transition stiffener portion.

Referring generally to FIGS. 1A and 1B and particularly to, e.g., FIGS. 18-21, stiffener 100 further comprises cover layer 176 between web 120 and subsequent charge A, initial charge 148, and base charge 124. Cover layer 176 covers first stiffener portion 102, formed, at least partially, by first base-charge portion 142 of base charge 124, first initial-charge portion 150 of initial charge 148, and first subsequent-charge-A portion of subsequent charge A. Cover layer 176 also covers a part of transition stiffener portion 110, formed, at least partially, by transition base-charge portion 146 of base charge 124, transition initial-charge portion 152 of initial charge 148, and transition subsequent-charge-A portion of subsequent charge A. Additionally, cover layer 176 covers a part of second stiffener portion 106, formed, at least partially, by second base-charge portion 144 of base charge 124. The preceding subject matter of this paragraph characterizes example 41 of the present disclosure, wherein example 41 also includes the subject matter according to example 40, above.

Covering (e.g., wrapping) base charge 124, initial charge 148 and subsequent charge A with cover layer 176 further integrates base charge 124, initial charge 148 and subsequent charge A (e.g., charges 160) into a continuous part of stiffener 100 capable of reacting to bending loads and transferring loads between first stiffener portion 102 and second stiffener portion 106.

Referring generally to FIGS. 1A and 1B and particularly to, e.g., FIGS. 18-21, cover layer 176 covers at least a portion of surface 204 of skin 202. The preceding subject matter of this paragraph characterizes example 42 of the present disclosure, wherein example 42 also includes the subject matter according to example 41, above.

Covering (e.g., wrapping) base charge 124, initial charge 148 and subsequent charge A (e.g., charges 160) and at least a portion of surface 204 of skin 202 with cover layer 176 further integrates base charge 124, initial charge 148, subsequent charge A and skin 202 into integral structure 200 capable of reacting to bending loads and transferring loads between first stiffener portion 102 and second stiffener portion 106 and along skin 202.

Referring generally to FIGS. 1A and 1B and particularly to, e.g., FIGS. 2-5 and 20-22, web 120 of stiffener 100 comprises web charge 178 that comprises second web-charge portion 180, forming a part of second stiffener portion 106, and transition web-charge portion 182, forming a part of transition stiffener portion 110. Web 120 of stiffener 100 also comprises opposing web charge 184, abutting a portion of web charge 178. Opposing web charge 184 comprises second opposing-web-charge portion 186, forming a part of second stiffener portion 106, and transition opposing-web-charge portion 188, forming a part of transition stiffener portion 110. The preceding subject matter of this paragraph characterizes example 43 of the present disclosure, wherein example 43 also includes the subject matter according to any one of examples 40-42, above.

Web charge 178 and opposing web charge 184 in combination enable second stiffener portion 106 and transition stiffener portion 110 to suitably react to bending loads primarily due to compression and provides the majority of the height and a part of the shape of second cross-sectional profile 108 of second stiffener portion 106 and transition cross-sectional profiles 112 of transition stiffener portion.

Referring generally to FIGS. 1A and 1B and particularly to, e.g., FIGS. 2-5 and 9-11, thicknesses T of transition web-charge portion 182 of web charge 178 and of transition opposing-web-charge portion 188 of opposing web charge 184 progressively decrease from second stiffener portion 106 to first stiffener portion 102. The preceding subject matter of this paragraph characterizes example 44 of the present disclosure, wherein example 44 also includes the subject matter according to example 43, above.

Thickness T of transition web-charge portion 182 of web charge 178 and of transition opposing-web-charge portion 188 of opposing web charge 184 gradually decreasing from second stiffener portion 106 to first stiffener portion 102 gradually reduces the transition cross-sectional profiles 112 from second stiffener portion 106 to first stiffener portion 102.

Referring generally to FIGS. 1A and 1B and particularly to, e.g., FIGS. 2-5, 9-11, 21 and 22, transition web-charge portion 182 of web charge 178 and transition opposing-web-charge portion 188 of opposing web charge 184 taper from second stiffener portion 106 to first stiffener portion 102. The preceding subject matter of this paragraph characterizes example 45 of the present disclosure, wherein example 45 also includes the subject matter according to any one of examples 43 or 44, above.

Transition web-charge portion 182 of web charge 178 and transition opposing-web-charge portion 188 of opposing web charge 184 being tapered from second stiffener portion 106 to first stiffener portion 102 smoothly transitions the transition cross-sectional profiles 112 from second stiffener portion 106 to first stiffener portion 102.

Referring generally to FIGS. 1A and 1B and particularly to, e.g., FIGS. 2-6, 9, 10 and 20-22, each of web charge 178 and opposing web charge 184 is L-shaped. The preceding subject matter of this paragraph characterizes example 46 of the present disclosure, wherein example 46 also includes the subject matter according to any one of examples 43-45, above.

L-shaped web charge 178 and opposing web charge 184 are used to form a part of T-shaped second cross-sectional profile 108 of second stiffener portion 106.

Referring generally to FIGS. 1A and 1B and particularly to, e.g., FIG. 7, each of web charge 178 and opposing web charge 184 is U-shaped. The preceding subject matter of this paragraph characterizes example 47 of the present disclosure, wherein example 47 also includes the subject matter according to any one of examples 43-45, above.

U-shaped web charge 178 and opposing web charge 184 are used to form a part of I-shaped second cross-sectional profile 108 of second stiffener portion 106.

Referring generally to FIGS. 1A and 1B and particularly to, e.g., FIG. 7, stiffener 100 further comprises cap charge 190, laminated onto portions of web charge 178, and opposing web charge 184. Cap charge 190 forms a part of second stiffener portion 106 and a part of transition stiffener portion 110. The preceding subject matter of this paragraph characterizes example 48 of the present disclosure, wherein example 48 also includes the subject matter according to example 47, above.

Cap charge 190 intercouples web charge 178 and opposing web charge 184 and forms a part of the I-shaped second cross-sectional profile 108 of second stiffener portion 106. Cap charge 190 further enables second stiffener portion 106 and transition stiffener portion 110 to suitably react to bending loads primarily due to compression loading.

Referring generally to FIGS. 1A and 1B and particularly to, e.g., FIGS. 2-7, 9, 10 and 19-22, stiffener 100 further comprises filler charge 192 between web charge 178 and opposing web charge 184. Filler charge 192 comprises second filler-charge portion 194, forming a part of second stiffener portion 106, and transition filler-charge portion 196, forming a part of transition stiffener portion 110. The preceding subject matter of this paragraph characterizes example 49 of the present disclosure, wherein example 49 also includes the subject matter according to any one of examples 43-48, above.

Filler charge 192 enhances the load-carrying capabilities of stiffener 100 and structure 200.

Referring generally to FIGS. 1A and 1B and particularly to, e.g., FIG. 15, stiffener 100 further comprises subsequent charge B, laminated onto subsequent charge A. Subsequent charge B comprises first subsequent-charge-B portion, forming a part of first stiffener portion 102, and transition subsequent-charge-B portion, forming a part of transition stiffener portion 110. First subsequent-charge-B portion of subsequent charge B is shaped identically to first subsequent-charge-A portion of subsequent charge A. Transition subsequent-charge-B portion of subsequent charge B is smaller than transition subsequent-charge-A portion of subsequent charge A and is shaped identically to a portion of transition subsequent-charge-A portion. The preceding subject matter of this paragraph characterizes example 50 of the present disclosure, wherein example 50 also includes the subject matter according to any one of examples 39-49, above.

Subsequent charge B being stacked and laminated onto subsequent charge A further increases combined height H1 (FIGS. 8-11) of charges 160, further partially defines first cross-sectional profile 104 of first stiffener portion 102 and transition cross-sectional profiles 112 of transition stiffener portion 110, and enhances the load-carrying capabilities of stiffener 100 and, thus, structure 200.

Referring generally to FIGS. 1A and 1B and particularly to, e.g., FIGS. 16 and 17, stiffener 100 further comprises subsequent charges B through N, sequentially laminated onto subsequent charge A. Subsequent charges B through N, respectively, comprise first subsequent-charge-B-through-N portions, forming a part of first stiffener portion 102, and transition subsequent-charge-B-through-N portions, forming a part of transition stiffener portion 110. First subsequent-charge-B-through-N portions of subsequent charges B through N are shaped identically to first subsequent-charge-A portion of subsequent charge A. Transition subsequent-charge-B-through-N portions of subsequent charges B through N are smaller than transition subsequent-charge-A portion of subsequent charge A. Each one of transition subsequent-charge-B-through-N portions of subsequent charges B through N is smaller than a preceding one of transition subsequent-charge-B-through-N portions of subsequent charges B through N. Each one of is transition subsequent-charge-B-through-N portions of subsequent charges B through N is shaped identically to a portion of transition subsequent-charge-A portion. The preceding subject matter of this paragraph characterizes example 51 of the present disclosure, wherein example 51 also includes the subject matter according to any one of examples 39-49, above.

Subsequent charges B through N being sequentially stacked and laminated onto subsequent charge A further increases combined height H1 (FIGS. 8-11) of charges 160, further partially defines first cross-sectional profile 104 of first stiffener portion 102 and transition cross-sectional profiles 112 of transition stiffener portion 110, and enhances the load-carrying capabilities of stiffener 100 and, thus, structure 200.

Referring generally to FIGS. 1A and 1B and particularly to, e.g., FIG. 23, structure 200 also comprises first brace 210, coupled to first stiffener portion 102 of stiffener 100. Structure 200 further comprises second brace 212, coupled to second stiffener portion 106 of stiffener 100. The preceding subject matter of this paragraph characterizes example 52 of the present disclosure, wherein example 52 also includes the subject matter according to any one of examples 26-51, above.

First brace 210 and second brace 212 couples stiffener 100 and, thus, skin 202 to another component, for example, another component of structure 200 positioned opposite skin 202 and distribute loads.

First brace 210 is configured (e.g., suitably shaped) to be coupled to first cross-sectional profile 104 of first stiffener portion 102. Second brace 212 is configured (e.g., suitably shaped) to be coupled to second cross-sectional profile 108 of second stiffener portion 106.

Referring generally to FIGS. 1A and 1B and particularly to, e.g., FIG. 23, transition stiffener portion 110 is positioned between first brace 210 and second brace 212. The preceding subject matter of this paragraph characterizes example 53 of the present disclosure, wherein example 53 also includes the subject matter according to example 52, above.

Positioning transition stiffener portion 110 between first brace 210 and second brace 212 enables effective load transfer between first stiffener portion 102 and second stiffener portion 106 (e.g., from second stiffener portion 106 to first stiffener portion 102) and distribution of the load to first brace 210 and second brace 212.

Referring generally to FIGS. 1A and 1B and particularly to, e.g., FIG. 23, skin 202 is upper skin 216. Stiffener 100 is upper stiffener 220. Structure 200 further comprises lower skin 218 opposite upper skin 216 and lower stiffener 222 coupled to lower skin 218. First brace 210 and second brace 212 are coupled to upper stiffener 220 and lower stiffener 222. The preceding subject matter of this paragraph characterizes example 54 of the present disclosure, wherein example 54 also includes the subject matter according to any one of examples 52 or 53, above.

Upper skin 216 stiffened by upper stiffener 220 and lower skin 218 stiffened by lower stiffener 222 form structure 200, such as a box structure, with upper skin 216 and lower skin 222 being spaced apart and intercoupled by first brace 210 and second brace 212.

Upper stiffener 220 including second stiffener portion 106 having a high profile (e.g., a tall second cross-sectional profile 108) and first stiffener portion 102 having a low profile (e.g., a short first cross-sectional profile 104) enables a distance between upper skin 216 and lower skin 218 to be reduced, at least along first stiffener portion 102 of upper stiffener 220, resulting in structure 200 having a reduced thickness and/or an increase in the available clearance between upper skin 216 (and upper stiffener 220) and lower skin 218 (and lower stiffener 222).

Referring generally to FIGS. 1A and 1B and particularly to, e.g., FIGS. 23 and 24, structure 200 is wing 206 of aircraft 208. Upper stiffener 220 is upper stringer 224 of wing 206. Lower stiffener 222 is lower stringer 226 of wing 206. First brace 210 and second brace 212 are each rib 214 of wing 206. The preceding subject matter of this paragraph characterizes example 55 of the present disclosure, wherein example 55 also includes the subject matter according to example 54, above.

Upper stringer 224 having a low profile portion (e.g., first stiffener portion 102 having first cross-sectional profile 104) enables a decrease in the thickness of wing 206, at least along a portion of wing 206 stiffened by first stiffener portion 102 of upper stringer 224 (e.g., outboard portion 242 of wing 206).

As one example, distance D (FIG. 23) between upper skin 216 having upper stringer 224 and lower skin 218 having lower stringer 226 may be reduced along a length of wing 206 associated with first stiffener portion 102 having first cross-sectional profile 104. Because first cross-sectional profile 104 of first stiffener portion 102 of upper stringer 216 is relatively short (e.g., compared to a relatively tall second cross-sectional profile 108 of second stringer portion 106), distance D can be decreased, for example, about outboard portion 242 of wing 206, while allowing a sufficient clearance between upper skin 216 and lower skin 218.

Ribs 214 provide shape and support to wing 206 (e.g., the wingbox structure). Ribs 214 distribute loads from and between upper stringer 224 and lower stringer 226. A distance between ribs 214 may define a rib bay (not explicitly illustrated). Transition stiffener portion 110 of upper stiffener 224 may be positioned within the rib bay (e.g., may extend between adjacent ribs 214).

Referring generally to FIGS. 1A and 1B and particularly to, e.g., FIG. 23, lower stiffener 222 has a constant cross-sectional profile. The preceding subject matter of this paragraph characterizes example 56 of the present disclosure, wherein example 56 also includes the subject matter according to example 55, above.

A constant cross-sectional profile of lower stiffener 222 enables lower stiffener 222 to suitably react to certain types of loads (e.g., bending loads primarily due to tension loading).

The cross-sectional profile of lower stiffener 222 may have any suitable shape depending upon the particular structural application of lower stiffener 222, for example, when used to construct structure 200. As one example, the cross-sectional profile of lower stiffener 222 may be designed to react to bending loads primarily due to tension.

Lower stiffener 222 may have a different cross-sectional profile than a cross-sectional profile of at least part of upper stiffener 220. As one example, the cross-sectional profile of lower stiffener 222 may be the same as first cross-sectional profile 104 of first stiffener portion 102 of upper stiffener 220 and different than second cross-sectional profile 108 of second stiffener portion 106 of upper stiffener 220.

Referring generally to FIGS. 1A and 1B and particularly to, e.g., FIG. 23, cross-sectional profile of lower stiffener 222 is trapezoidal. The preceding subject matter of this paragraph characterizes example 57 of the present disclosure, wherein example 57 also includes the subject matter according to any one of examples 55 or 56, above.

A trapezoidally shaped cross-sectional profile of lower stiffener 222 enables lower stiffener 222 to suitably react to bending loads primarily due to tension loading, while also providing a relatively short profile height.

Referring generally to FIGS. 1A and 1B and particularly to, e.g., FIG. 24, wing 206 comprises a length, first end 228 coupled to fuselage 232 of aircraft 208, and second end 230 opposite first end 228. Upper stiffener 220 extends continuously from first end 228 of wing 206 to second end 230 of wing 206. The preceding subject matter of this paragraph characterizes example 58 of the present disclosure, wherein example 58 also includes the subject matter according to any one of examples 55-57, above.

Second stiffener portion 106 having second cross-sectional profile 108 of upper stiffener 220 (e.g., upper stringer 224) extending continuously from first end 228 to second end 230 of wing 206 enables wing 206 to react to bending loads primarily due to compression.

As one example, at least a portion of the length of wing 206 that experiences bending loads primary from compression is stiffened by second stiffener portion 106 of upper stiffener 220. A remaining portion of the length of wing 206 (e.g., outboard portion 242) is stiffened by first stiffener portion 102 of upper stiffener 220 since bending loads primarily from compression imposed on wing 206 are less farther from fuselage 232.

Referring generally to FIGS. 1A and 1B and particularly to, e.g., FIG. 24, transition portion 110 of upper stiffener 220 is located at least twenty-five percent of length of wing 206 away from second end 230 of wing 206. The preceding subject matter of this paragraph characterizes example 59 of the present disclosure, wherein example 59 also includes the subject matter according to example 58, above.

Transition portion 110 of upper stiffener 220 being located at least twenty-five percent of length of wing 206 away from second end 230 of wing 206 defines the length of first stiffener portion 102 of upper stiffener 220 relative to second stiffener portion 106 of upper stiffener 220 and enables a reduction in thickness of an outermost twenty-five percent of wing 206.

Referring generally to FIGS. 1A and 1B and particularly to, e.g., FIG. 24, transition portion 110 of upper stiffener 220 is located at least fifty percent of length of wing 206 away from first end 228 of wing 206. The preceding subject matter of this paragraph characterizes example 60 of the present disclosure, wherein example 60 also includes the subject matter according to example 59, above.

Transition portion 110 of upper stiffener 220 being located at least fifty percent of length of wing 206 away from second end 230 of wing 206 defines the length of first stiffener portion 102 of upper stiffener 220 relative to second stiffener portion 106 of upper stiffener 220 and enables a reduction in thickness of an outermost fifty percent of wing 206.

Referring generally to FIGS. 1A and 1B and particularly to, e.g., FIGS. 2-11 and 22, stiffener 100 is co-cured with skin 202. The preceding subject matter of this paragraph characterizes example 61 of the present disclosure, wherein example 61 also includes the subject matter according to any one of examples 26-60, above.

Co-curing stiffener 100 and skin 202 bonds stiffener 100 and skin 202 at least partially defines the load bearing and load transferring characteristics of structure 200. In the co-curing process, both stiffener 100 and skin 202 are formed from an uncured composite material. All resins of the uncured composite materials of both stiffener 100 and skin 202 are simultaneously cured during the same process to bond stiffener 100 to skin 202.

Referring generally to FIGS. 1A and 1B and particularly to, e.g., FIGS. 2-11 and 22, stiffener 100 is co-bonded to skin 202. The preceding subject matter of this paragraph characterizes example 62 of the present disclosure, wherein example 62 also includes the subject matter according to any one of examples 26-60, above.

Co-bonding stiffener 100 and skin 202 bonds stiffener 100 and skin 202 at least partially defines the load bearing and load transferring characteristics of structure 200. In the co-bonding process, one of stiffener 100 and skin 202 is formed from an uncured composite material and one of stiffener 100 and skin 202 is formed from a cured composite material. Resins of the uncured composite material are cured during the process to bond stiffener 100 to skin 202.

Referring generally to FIGS. 1A and 1B and particularly to, e.g., FIGS. 2-11 and 22, stiffener 100 is secondarily bonded to skin 202. The preceding subject matter of this paragraph characterizes example 63 of the present disclosure, wherein example 63 also includes the subject matter according to any one of examples 26-60, above.

Secondarily bonding stiffener 100 and skin 202 bonds stiffener 100 and skin 202 at least partially defines the load bearing and load transferring characteristics of structure 200. In the secondary bonding process, both stiffener 100 and skin 202 are formed from a cured (e.g., pre-cured) composite material. An adhesive is applied between stiffener 100 and skin 202 and is cured during the same process to bond stiffener 100 to skin 202.

Referring generally to FIGS. 1A, 1B and 2-14 and particularly to, e.g., FIG. 25A, method 300 of making stiffener 100 is disclosed. Method 300 comprises laying up base charge 124 to form a part of first stiffener portion 102 of stiffener 100 from first base-charge portion 142 of base charge 124, to form a part of second stiffener portion 106 of stiffener 100 from second base-charge portion 144 of base charge 124, and to form a part of transition stiffener portion 110 of stiffener 100 from transition base-charge portion 146 of base charge 124 (Block 302). Transition base-charge portion 146 tapers from second base-charge portion 144 to first base-charge portion 142 (Block 304). Method 300 also comprises laminating initial charge 148 onto base charge 124 to form a part of first stiffener portion 102 of stiffener 100 from first initial-charge portion 150 of initial charge 148 and to form a part of transition stiffener portion 110 of stiffener 100 from transition initial-charge portion 152 of initial charge 148 (Block 306). First initial-charge portion 150 of initial charge 148 is shaped identically to first base-charge portion 142 of base charge 124 (Block 308). Transition initial-charge portion 152 of initial charge 148 is shaped identically to at least a portion of transition base-charge portion 146 of base charge 124 (Block 310). Method 300 also comprises laminating subsequent charge A onto initial charge 148 to form a part of first stiffener portion 102 of stiffener 100 from first subsequent-charge-A portion of subsequent charge A and to form a part of transition stiffener portion 110 of stiffener 100 from transition subsequent-charge-A portion of subsequent charge A (Block 312). First subsequent-charge-A portion of subsequent charge A is shaped identically to first initial-charge portion 150 of initial charge 148 (Block 314). Transition subsequent-charge-A portion of subsequent charge A is smaller than transition initial-charge portion 152 of initial charge 148 and is shaped identically to a portion of transition initial-charge portion 152 (Block 316). The preceding subject matter of this paragraph characterizes example 64 of the present disclosure.

Laminating a successive stack of base charge 124, initial charge 148 and subsequent charge A thereby forms integral and continuous portions of part of stiffener 100 (e.g., first stiffener portion 102, part of transition stiffener portion 110, and part of second stiffener portion 106) capable of effectively reacting to loads (e.g., different bending loads) and transferring loads between first stiffener portion 102 and the part of second stiffener portion 106 along the part of transition stiffener portion 110.

Referring generally to FIGS. 1A, 1B and 15 and particularly to, e.g., FIG. 25A, method 300 also comprises laminating subsequent charge B onto subsequent charge A to form a part of first stiffener portion 102 of stiffener 100 from first subsequent-charge-B portion of subsequent charge B and to form a part of transition stiffener portion 110 of stiffener 100 from transition subsequent-charge-B portion of subsequent charge B (Block 318). First subsequent-charge-B portion of subsequent charge B is shaped identically to first subsequent-charge-A portion of subsequent charge A (Block 320). Transition subsequent-charge-B portion of subsequent charge B is smaller than transition subsequent-charge-A portion of subsequent charge A and is shaped identically to a portion of transition subsequent-charge-A portion (Block 322). The preceding subject matter of this paragraph characterizes example 65 of the present disclosure, wherein example 65 also includes the subject matter according to example 64, above.

Laminating subsequent charge B stacked onto subsequent charge A further increases combined height H1 (FIGS. 8-11) of the part of first stiffener portion 102 and transition stiffener portion 110, further partially defines first cross-sectional profile 104 of first stiffener portion 102 and transition cross-sectional profiles 112 of transition stiffener portion 110, and enhances the load-carrying capabilities of stiffener 100.

Referring generally to FIGS. 1A, 1B, 16 and 17 and particularly to, e.g., FIG. 25B, method 300 further comprises providing a smooth transition among transition initial-charge portion 152 of initial charge 148, transition subsequent-charge-A portion of subsequent charge A, and transition subsequent-charge-B portion of subsequent charge B (Block 324). The preceding subject matter of this paragraph characterizes example 66 of the present disclosure, wherein example 66 also includes the subject matter according to example 65, above.

Providing a smooth transition among transition initial-charge portion 152 of initial charge 148, transition subsequent-charge-A portion of subsequent charge A, and transition subsequent-charge-B portion of subsequent charge B gradually changes the centroid of the part of stiffener 100 and reduces the potential of transition initial-charge portion 152 of initial charge 148, transition subsequent-charge-A portion of subsequent charge A, and transition subsequent-charge-B portion of subsequent charge B pulling away from each other, for example, under a bending load.

Referring generally to FIGS. 1A, 1B, 16 and 17 and particularly to, e.g., FIG. 25B, providing the smooth transition among transition initial-charge portion 152 of initial charge 148, transition subsequent-charge-A portion of subsequent charge A, and transition subsequent-charge-B portion of subsequent charge B (Block 324) comprises removing end portions of transition initial-charge portion 152, transition subsequent-charge-A portion, and transition subsequent-charge-B portion (Block 326). The preceding subject matter of this paragraph characterizes example 67 of the present disclosure, wherein example 67 also includes the subject matter according to example 66, above.

Removing end portions of transition initial-charge portion 152, transition subsequent-charge-A portion, and transition subsequent-charge-B portion, for example, at a predetermined cutting angle (e.g., similar to the ramp rate of the increase in combined height H1 of charges 160), provides a smooth surface along the part of transition stiffener portion 110.

As one example, cover layer 176, filler charge 192, and/or web 120 may be stacked on and laminated to the smooth surface of transition stiffener portion 110.

As one example, ends portions (illustrated but not explicitly identified) of transition initial-charge portion 152, transition subsequent-charge-A portion, and transition subsequent-charge-B portion may be removed (e.g., cut off) by using an ultrasonic knife (not explicitly illustrated), for example, under computer control. As one example, ends portions of transition initial-charge portion 152, transition subsequent-charge-A portion, and transition subsequent-charge-B portion may be cut away at an angle.

Referring generally to FIGS. 1A, 1B and 18 and particularly to, e.g., FIG. 25B, method 300 also comprises covering, with cover layer 176, first stiffener portion 102, formed, at least partially, by first base-charge portion 142 of base charge 124, first initial-charge portion 150 of initial charge 148, and first subsequent-charge-A portion of subsequent charge A (Block 328). Method 300 also comprises covering, with cover layer 176, a part of transition stiffener portion 110 formed, at least partially, by transition base-charge portion 146 of base charge 124, transition initial-charge portion 152 of initial charge 148, and transition subsequent-charge-A portion of subsequent charge A (Block 330). Additionally, method 300 comprises covering, with cover layer 176, a part of second stiffener portion 106, formed, at least partially, by second base-charge portion 144 of base charge 124 (Block 332). The preceding subject matter of this paragraph characterizes example 68 of the present disclosure, wherein example 68 also includes the subject matter according to any one of examples 65-67, above.

Covering (e.g., wrapping) first stiffener portion 102, the part of transition stiffener portion 110, and the part of second stiffener portion 106 with cover layer 176 further integrates first base-charge portion 142 of base charge 124, first initial-charge portion 150 of initial charge 148, first subsequent-charge-A portion of subsequent charge A, transition base-charge portion 146 of base charge 124, transition initial-charge portion 152 of initial charge 148, transition subsequent-charge-A portion of subsequent charge A, and second base-charge portion 144 of base charge 124 into a continuous part of stiffener 100 capable of reacting to bending loads and transferring loads between first stiffener portion 102 and second stiffener portion 106 along transition stiffener portion 110.

Referring generally to FIGS. 1A, 1B and 22 and particularly to, e.g., FIG. 25B, method 300 further comprises adding web 120 that forms a part of second stiffener portion 106 and a part of transition stiffener portion 110 (Block 334). The preceding subject matter of this paragraph characterizes example 69 of the present disclosure, wherein example 69 also includes the subject matter according to any one of examples 64-68, above.

Providing web 120 enables second stiffener portion 106 and transition stiffener portion 110 to suitably react to bending loads primarily due to compression.

Referring generally to FIGS. 1A, 1B, 20 and 21 and particularly to, e.g., FIG. 25B, adding web 120 (Block 334) comprises forming a part of second stiffener portion 106 from second web-charge portion 180 of web charge 178 (Block 336). Adding web 120 also comprises forming a part of transition stiffener portion 110 from transition web-charge portion 182 of web charge 178 (Block 338). Adding web 102 further comprises abutting opposing web charge 184 with web charge 178 (Block 340), forming a part of second stiffener portion 106 from second opposing-web-charge portion 186 of opposing web charge 184 (Block 342), and forming a part of transition stiffener portion 110 from transition opposing-web-charge portion 188 of opposing web charge 184 (Block 344). The preceding subject matter of this paragraph characterizes example 70 of the present disclosure, wherein example 70 also includes the subject matter according to example 69, above.

In combination, providing web charge 178 and opposing web charge 184 enable second stiffener portion 106 and transition stiffener portion 110 to suitably react to bending loads primarily due to compression and provides the majority of the height and a part of the shape of second cross-sectional profile 108 of second stiffener portion 106 and transition cross-sectional profiles 112 of transition stiffener portion.

Referring generally to FIGS. 1A, 1B and 19-21 and particularly to, e.g., FIG. 25B, method 300 further comprises placing filler charge 192 between web charge 178 and opposing web charge 184 to form a part of second stiffener portion 106 from second filler-charge portion 194 of filler charge 192 and to form a part of transition stiffener portion 110 from transition filler-charge portion 196 of filler charge 192 (Block 346). The preceding subject matter of this paragraph characterizes example 71 of the present disclosure, wherein example 71 also includes the subject matter according to example 70, above.

Providing filler charge 192 between web charge 178 and opposing web charge 184 fills an open space between web charge 178 and opposing web charge 184 enhances the load-carrying capabilities of stiffener 100.

Referring generally to FIGS. 1A, 1B and 22 and particularly to, e.g., FIG. 25B, method 300 further comprises trimming transition web-charge portion 182 of web charge 178 and transition opposing-web-charge portion 188 of opposing web charge 184 such that transition web-charge portion 182 of web charge 178 and transition opposing-web-charge portion 188 of opposing web charge 184 taper from second stiffener portion 106 to first stiffener portion 102 (Block 348). The preceding subject matter of this paragraph characterizes example 72 of the present disclosure, wherein example 72 also includes the subject matter according to any one of examples 70 or 71, above.

Trimming transition web-charge portion 182 of web charge 178 and transition opposing-web-charge portion 188 of opposing web charge 184 to taper transition web-charge portion 182 and transition opposing-web-charge portion 188 from second stiffener portion 106 to first stiffener portion 102 provides smooth transition between second stiffener portion 106 to first stiffener portion 102 along transition stiffener portion 110 and gradually changes the centroid of stiffener 100.

As one example, transition web-charge portion 182 of web charge 178 and transition opposing-web-charge portion 188 of opposing web charge 184 may be performed (e.g., cut off) by using an ultrasonic knife (not explicitly illustrated), for example, under computer control. As one example, ends portions of transition initial-charge portion 152, transition subsequent-charge-A portion, and transition subsequent-charge-B portion may be cut away at an angle.

Examples of the present disclosure may be described in the context of aircraft manufacturing and service method 1100 as shown in FIG. 26 and aircraft 1102 as shown in FIG. 27. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 27, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus (es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus (es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method of making a stiffener, the method comprising:
   laying up a base charge to form a part of a first stiffener portion of the stiffener from a first base-charge portion of the base charge, to form a part of a second stiffener portion of the stiffener from a second base-charge portion of the base charge, and to form a part of a transition stiffener portion of the stiffener from a transition base-charge portion of the base charge, wherein the transition base-charge portion tapers from the second base-charge portion to the first base-charge portion;
   laminating an initial charge onto the base charge to form a part of the first stiffener portion of the stiffener from a first initial-charge portion of the initial charge and to form a part of the transition stiffener portion of the stiffener from a transition initial-charge portion of the initial charge, wherein the first initial-charge portion of the initial charge is shaped identically to the first base-charge portion of the base charge and the transition initial-charge portion of the initial charge is shaped identically to at least a portion of the transition base-charge portion of the base charge; and
   laminating a subsequent charge A onto the initial charge to form a part of the first stiffener portion of the stiffener from a first subsequent-charge-A portion of the subsequent charge A and to form a part of the transition stiffener portion of the stiffener from a transition subsequent-charge-A portion of the subsequent charge A, wherein the first subsequent-charge-A portion of the subsequent charge A is shaped identically to the first initial-charge portion of the initial charge and the transition subsequent-charge-A portion of the subsequent charge A is smaller than the transition initial-charge portion of the initial charge and is shaped identically to a portion of the transition initial-charge portion.

2. The method according to claim 1, further comprising adding a web that forms a part of the second stiffener portion and a part of the transition stiffener portion.

3. The method according to claim 1, further comprising:
laminating a subsequent charge B onto the subsequent charge A to form a part of the first stiffener portion of the stiffener from a first subsequent-charge-B portion of the subsequent charge B and to form a part of the transition stiffener portion of the stiffener from a transition subsequent-charge-B portion of the subsequent charge B.

4. The method according to claim 3, wherein the first subsequent-charge-B portion of the subsequent charge B is shaped identically to the first subsequent-charge-A portion of the subsequent charge A and the transition subsequent-charge-B portion of the subsequent charge B is smaller than the transition subsequent-charge-A portion of the subsequent charge A and is shaped identically to a portion of the transition subsequent-charge-A portion.

5. The method according to claim 4, further comprising adding a web that forms a part of the second stiffener portion and a part of the transition stiffener portion.

6. The method according to claim 4, further comprising covering with a cover layer the first stiffener portion, formed, at least partially, by the first base-charge portion of the base charge, the first initial-charge portion of the initial charge, and the first subsequent-charge-A portion of the subsequent charge A.

7. The method according to claim 4, further comprising covering with a cover layer a part of the transition stiffener portion formed, at least partially, by the transition base-charge portion of the base charge, the transition initial-charge portion of the initial charge and the transition subsequent-charge-A portion of the subsequent charge A.

8. The method according to claim 4, further comprising covering with a cover layer a part of the second stiffener portion, formed, at least partially, by the second base-charge portion of the base charge.

9. The method according to claim 4, further comprising covering with a cover layer:
the first stiffener portion, formed, at least partially, by the first base-charge portion of the base charge, the first initial-charge portion of the initial charge, and the first subsequent-charge-A portion of the subsequent charge A;
a part of the transition stiffener portion formed, at least partially, by the transition base-charge portion of the base charge, the transition initial-charge portion of the initial charge and the transition subsequent-charge-A portion of the subsequent charge A; and
a part of the second stiffener portion, formed, at least partially, by the second base-charge portion of the base charge.

10. The method according to claim 4, further comprising a step of providing a smooth transition among the transition initial-charge portion of the initial charge, the transition subsequent-charge-A portion of the subsequent charge A, and the transition subsequent-charge-B portion of the subsequent charge B.

11. The method according to claim 10, further comprising adding a web that forms a part of the second stiffener portion and a part of the transition stiffener portion.

12. The method according to claim 10, further comprising covering with a cover layer:
the first stiffener portion, formed, at least partially, by the first base-charge portion of the base charge, the first initial-charge portion of the initial charge, and the first subsequent-charge-A portion of the subsequent charge A;
a part of the transition stiffener portion formed, at least partially, by the transition base-charge portion of the base charge, the transition initial-charge portion of the initial charge and the transition subsequent-charge-A portion of the subsequent charge A; and
a part of the second stiffener portion, formed, at least partially, by the second base-charge portion of the base charge.

13. The method according to claim 10, wherein the step of providing the smooth transition among the transition initial-charge portion of the initial charge, the transition subsequent-charge-A portion of the subsequent charge A, and the transition subsequent-charge-B portion of the subsequent charge B comprises removing end portions of the transition initial-charge portion, the transition subsequent-charge-A portion, and the transition subsequent-charge-B portion.

14. The method according to claim 13, further comprising adding a web that forms a part of the second stiffener portion and a part of the transition stiffener portion.

15. The method according to claim 13, further comprising covering with a cover layer:
the first stiffener portion, formed, at least partially, by the first base-charge portion of the base charge, the first initial-charge portion of the initial charge, and the first subsequent-charge-A portion of the subsequent charge A;
a part of the transition stiffener portion formed, at least partially, by the transition base-charge portion of the base charge, the transition initial-charge portion of the initial charge and the transition subsequent-charge-A portion of the subsequent charge A; and
a part of the second stiffener portion, formed, at least partially, by the second base-charge portion of the base charge.

16. The method according to claim 15, further comprising a step of adding a web that forms a part of the second stiffener portion and a part of the transition stiffener portion.

17. The method according to claim 16, wherein the step of adding the web that forms a part of the second stiffener portion and a part of the transition stiffener portion comprises:
forming a part of the second stiffener portion from a second web-charge portion of a web charge;
forming a part of the transition stiffener portion from a transition web-charge portion of the web charge;
abutting an opposing web charge with the web charge;
forming a part of the second stiffener portion from a second opposing-web-charge portion of the opposing web charge; and
forming a part of the transition stiffener portion from a transition opposing-web-charge portion of the opposing web charge.

18. The method according to claim 17, further comprising trimming the transition web-charge portion of the web charge and the transition opposing-web-charge portion of the opposing web charge such that the transition web-charge portion of the web charge and the transition opposing-web-charge portion of the opposing web charge taper from the second stiffener portion to the first stiffener portion.

19. The method according to claim 17, further comprising placing a filler charge between the web charge and the opposing web charge to form a part of the second stiffener portion from a second filler-charge portion of the filler charge and to form a part of the transition stiffener portion from a transition filler-charge portion of the filler charge.

20. The method according to claim 19, further comprising trimming the transition web-charge portion of the web charge and the transition opposing-web-charge portion of the opposing web charge such that the transition web-charge portion of the web charge and the transition opposing-web-charge portion of the opposing web charge taper from the second stiffener portion to the first stiffener portion.

\* \* \* \* \*